(12) United States Patent (10) Patent No.: US 12,063,337 B2
Hashimoto (45) Date of Patent: Aug. 13, 2024

(54) IMAGE PROCESSING APPARATUS, SCANNER, IMAGE FORMING APPARATUS, DATA MANAGEMENT SYSTEM, AND IMAGE PROCESSING METHOD

(71) Applicant: Ayumu Hashimoto, Kanagawa (JP)

(72) Inventor: Ayumu Hashimoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/123,348

(22) Filed: Mar. 20, 2023

(65) Prior Publication Data
US 2023/0308597 A1 Sep. 28, 2023

(30) Foreign Application Priority Data

Mar. 23, 2022 (JP) .................................. 2022-046423
Jan. 31, 2023 (JP) .................................. 2023-012946

(51) Int. Cl.
*H04N 1/62* (2006.01)
*H04N 1/00* (2006.01)
*H04N 1/028* (2006.01)
*H04N 1/04* (2006.01)
*H04N 1/21* (2006.01)
*H04N 1/48* (2006.01)
*H04N 1/60* (2006.01)

(52) U.S. Cl.
CPC .......... *H04N 1/626* (2013.01); *H04N 1/0044* (2013.01); *H04N 1/02815* (2013.01); *H04N 1/0449* (2013.01); *H04N 1/2104* (2013.01); *H04N 1/486* (2013.01); *H04N 1/6016* (2013.01)

(58) Field of Classification Search
CPC ..... H04N 1/626; H04N 1/486; H04N 1/40056
See application file for complete search history.

(56) References Cited

U.S. PATENT DOCUMENTS 6,493,115 B1 12/2002 Kanno et al.
10,924,621 B2 * 2/2021 Nakazawa ........... H04N 1/6027
(Continued)

FOREIGN PATENT DOCUMENTS

| JP | 11-205618 | | 7/1999 |
| JP | 11205618 A | * | 7/1999 |
| JP | 2021-005162 | | 1/2021 |

OTHER PUBLICATIONS

Hedjam Rachid et al: "Historical document image restoration using multispectral imaging system", Pattern Recognition, Elsevier, GB, vol. 46, No. 8, Jan. 29, 2013 (Jan. 29, 2013), pp. 2297-2312, XP028526799, 16pp.

(Continued)

*Primary Examiner* — Ted W Barnes
(74) *Attorney, Agent, or Firm* — XSENSUS LLP

(57) ABSTRACT

An image processing apparatus includes circuitry to receive visible image data obtained by reading of a subject with a sensor having sensitivity to visible light in a visible wavelength range and invisible image data obtained by reading of the subject with a sensor having sensitivity to invisible light in an invisible wavelength range. The circuitry generates image data for displaying, in a designated color, a portion of the visible image data corresponding to a designated region of the invisible image data. The designated region has an absorption rate equal to or higher than a predetermined absorption rate.

19 Claims, 22 Drawing Sheets

M10

COMPANY NAME IMPRINT SAMPLE
(a)

M11

COMPANY NAME IMPRINT SAMPLE
(c)

M20

COMPANY NAME IMPRINT SAMPLE
(b)

M12
COMPANY NAME IMPRINT SAMPLE
(d)

(56) References Cited

U.S. PATENT DOCUMENTS

| | | | |
|---|---|---|---|
| 11,012,585 B2* | 5/2021 | Hashimoto | H04N 23/11 |
| 11,190,666 B2* | 11/2021 | Ohmiya | G06V 10/225 |
| 2014/0376808 A1 | 12/2014 | Hashimoto | |
| 2018/0239282 A1* | 8/2018 | Sakai | H04N 1/00411 |
| 2019/0045087 A1* | 2/2019 | Shimamura | H04N 1/62 |
| 2019/0096040 A1* | 3/2019 | Sakabe | G06T 5/77 |
| 2020/0053229 A1* | 2/2020 | Hashimoto | H04N 1/6072 |
| 2020/0053230 A1* | 2/2020 | Nakazawa | G07D 7/12 |
| 2020/0053233 A1* | 2/2020 | Nakazawa | H04N 23/11 |
| 2020/0410271 A1* | 12/2020 | Nakazawa | H04N 1/40093 |
| 2020/0412904 A1* | 12/2020 | Ohmiya | G06V 10/145 |
| 2021/0021729 A1* | 1/2021 | Hashimoto | H04N 1/00811 |
| 2021/0227087 A1* | 7/2021 | Ozaki | H04N 1/00037 |
| 2021/0281712 A1* | 9/2021 | Nakamura | H04N 1/00755 |
| 2021/0400159 A1* | 12/2021 | Oyama | H04N 1/486 |
| 2021/0409566 A1* | 12/2021 | Hashimoto | H04N 1/02885 |
| 2022/0109778 A1* | 4/2022 | Nambara | H04N 1/00087 |
| 2022/0141350 A1* | 5/2022 | Yokoyama | H04N 1/00018 358/471 |

OTHER PUBLICATIONS

EESR issued Aug. 18, 2023, in corresponding European Application No. 23162872.8, 8pp.

* cited by examiner

RULED LINES AFFECT OCR RECOGNITION

COMPANY NAME IMPRINT SAMPLE

COMPANY NAME IMPRINT SAMPLE

COMPANY NAME IM*** ****

IMAGE PROCESSING APPARATUS, SCANNER, IMAGE FORMING APPARATUS, DATA MANAGEMENT SYSTEM, AND IMAGE PROCESSING METHOD

CROSS-REFERENCE TO RELATED APPLICATIONS

This patent application is based on and claims priority pursuant to 35 U.S.C. § 119(a) to Japanese Patent Application Nos. 2022-046423, filed on Mar. 23, 2022, and 2023-012946, filed on Jan. 31, 2023, in the Japan Patent Office, the entire disclosure of which is hereby incorporated by reference herein.

BACKGROUND

Technical Field

The present disclosure relates to an image processing apparatus, a scanner, an image forming apparatus, a data management system, and an image processing method.

Related Art

There is an optical character recognition (OCR) technique for automatically extracting text information from a scanned image. When a stamp is imprinted on a company name on a document, a color dropout function is used to remove a specific color in order to remove the stamp imprint, and then OCR is performed.

There is a technology of determining a text region using information obtained by infrared light reading and visible light reading, determining a black region using visible light information, and determines a black character based on these results.

SUMMARY

In one aspect, an image processing apparatus includes circuitry to receive visible image data obtained by reading of a subject with a sensor having sensitivity to visible light in a visible wavelength range and invisible image data obtained by reading of the subject with a sensor having sensitivity to invisible light in an invisible wavelength range. The circuitry generates image data for displaying, in a designated color, a portion of the visible image data corresponding to a designated region of the invisible image data. The designated region has an absorption rate equal to or higher than a predetermined absorption rate.

In another aspect, a scanner includes the above-described image processing, a visible light source to irradiate a subject with the visible light in the visible wavelength range, an invisible light source to irradiate the subject the invisible light in the invisible wavelength, a first image sensor to receive reflected light of the visible light from the subject and output visible image data, and a second image sensor to receive reflected light of the invisible light from the subject and output invisible image data.

In another aspect, an image forming apparatus includes the above-described image processing apparatus, and an image forming device to form an image according to the image data generated by the image processing apparatus.

In another aspect, a data management system includes the above-described image processing apparatus and an information processing apparatus. The circuitry of the image processing apparatus outputs the visible image data in addition to the image data for displaying, and the information processing apparatus stores the visible image data transmitted from the image processing apparatus and the image data for displaying, in association with each other.

In another aspect, an image processing method includes receiving visible image data obtained by reading of a subject with a sensor having sensitivity to visible light in a visible wavelength range and invisible image data obtained by reading of the subject with a sensor having sensitivity to invisible light in an invisible wavelength range, and generating image data for displaying, in a designated color, a portion of the visible image data corresponding to a designated region of the invisible image data. The designated region has an absorption rate equal to or higher than a predetermined absorption rate.

In another aspect, an image processing apparatus includes circuitry to receive visible image data obtained by reading of a subject with a sensor having sensitivity to visible light in a visible wavelength range and invisible image data obtained by reading of the subject with a sensor having sensitivity to invisible light in an invisible wavelength range. The circuitry generates image data for displaying, in a designated color, a portion of the visible image data corresponding to a designated region of the invisible image data. The designated region is an image region formed with a material including carbon.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
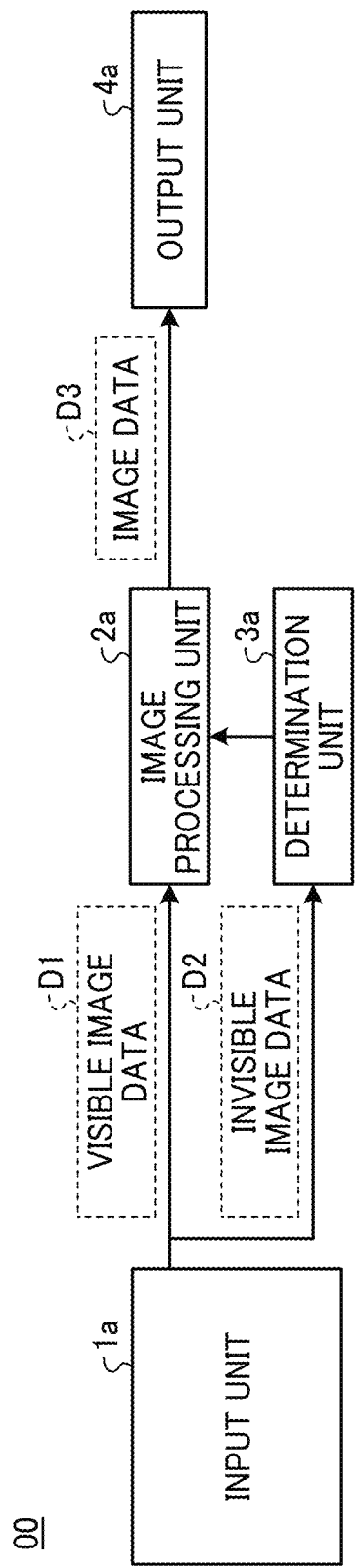
FIG. 1 is a block diagram illustrating a configuration of an image processing apparatus according to Embodiment 1.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, descriptions are given below in detail of an image processing apparatus, a scanner, an image forming apparatus, and a data management system as embodiments of the present disclosure, with reference to the accompanying drawings.

A description is given of Embodiment 1 of the present disclosure.

FIG. 1 is a block diagram illustrating a configuration of an image processing apparatus according to Embodiment 1. An image processing apparatus 00 includes an input unit 1$a$, an image processing unit 2$a$, a determination unit 3$a$, and an output unit 4$a$.

The input unit 1$a$ inputs an image (subject image) subject to the processing according to the present embodiment. The subject image includes visible image data D1 of the subject and invisible image data D2 of the subject. The determination unit 3$a$ determines a black-print region based on the invisible image data D2 input from the input unit 1$a$. Note that the "black-print region" corresponds to a "designated region" and will be described as a region in which black (designated color) characters are used, for ease of understanding. The "black-print region" is not limited thereto, and any region printed in black and may be referred to as a black print region.

On the basis of the visible image data D1 input from the input unit 1$a$ and the black-print region determined by the determination unit 3$a$, the image processing unit 2$a$ generates image data D3 for displaying, in black, a portion corresponding to the black-print region of the visible image data D1. The output unit 4$a$ outputs the image data D3. The destination to which the output unit 4$a$ outputs may be determined as appropriate. For example, the destination may be a display unit of the image processing apparatus 00 or an external device connected to the image processing apparatus 00.

In Embodiment 1, the image processing apparatus 00 is applied to a scanner (reading device). First, an overall configuration of a scanner is presented, and a description is given of an operation performed by the scanner to generate the image data D3 for displaying, in black, a portion corresponding to a black-print region of the visible image data D1 of a subject.

The scanner includes an imaging device serving as the input unit 1$a$. The configuration of the scanner according to the present embodiment is an example. Aspects of the present disclosure are applicable to any scanner that irradiates a subject with light from a light source, captures the light reflected from the subject with the imaging device, so as to read a subject image.

A process performed by the image processing unit 2$a$ and that performed by the determination unit 3$a$ correspond to processing for removing a stamp imprint from a subject image, which will be described later. A part or all of the processes may be performed by the scanner. Alternatively, a subject image read by the scanner may be input to an image processing apparatus separate from the scanner, and the image processing apparatus may perform the rest of the processes. When the image processing apparatus performs all processes, the subject image stored in the server, or the memory may be input to the image processing apparatus. Although the scanner includes the function of the image processing apparatus in the present embodiment, the image processing apparatus may be provided separately from the scanner.

Hereinafter, a "subject" may be referred to as "target of reading" or "document (to be read)." In this disclosure, the target of reading includes an object (e.g., a stamp imprint) that overlaps a black-print region printed in black and is to be removed. In the present embodiment, examples of the target of reading are paper documents such as various certificates, documents, or business forms on which a stamp imprint is pressed, but the object to be removed is not limited to the stamp imprint. In addition, the target of reading is not limited to a paper document.

Figure 2:
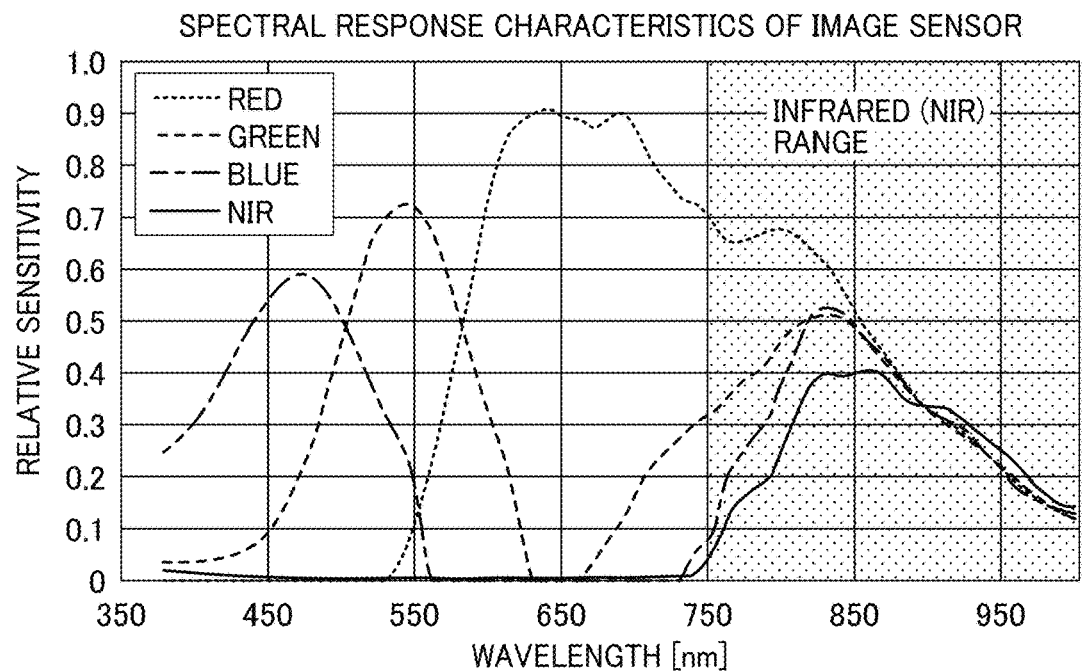
FIG. 2 is a graph illustrating an example of spectral response characteristics of an image sensor when near-infrared (NIR) light is used as invisible light.

"Visible image data" refers to image data read by a sensing device such as an image sensor having sensitivity to light (visible light) emitted from a light source in a visible wavelength range. "Invisible image data" refers to image data read by a sensing device such as an image sensor having sensitivity to light of a light source in an invisible wavelength range such as infrared light (including near-infrared light) or ultraviolet light. In the following, near-infrared image data (hereinafter, simply referred to as a near-infrared image) will be described as an example of the "invisible image data," but the invisible image data is not limited to the near-infrared image. In the example described below, near-infrared light is used as invisible light (see FIG. 2). As illustrated in FIG. 2, a general silicon image sensor has sensitivity in the near-infrared range (approximately 750 nm to 1100 nm). Since a conventional general-purpose image sensor can be used, the scanner can be implemented by a simple configuration.

Figure 3:
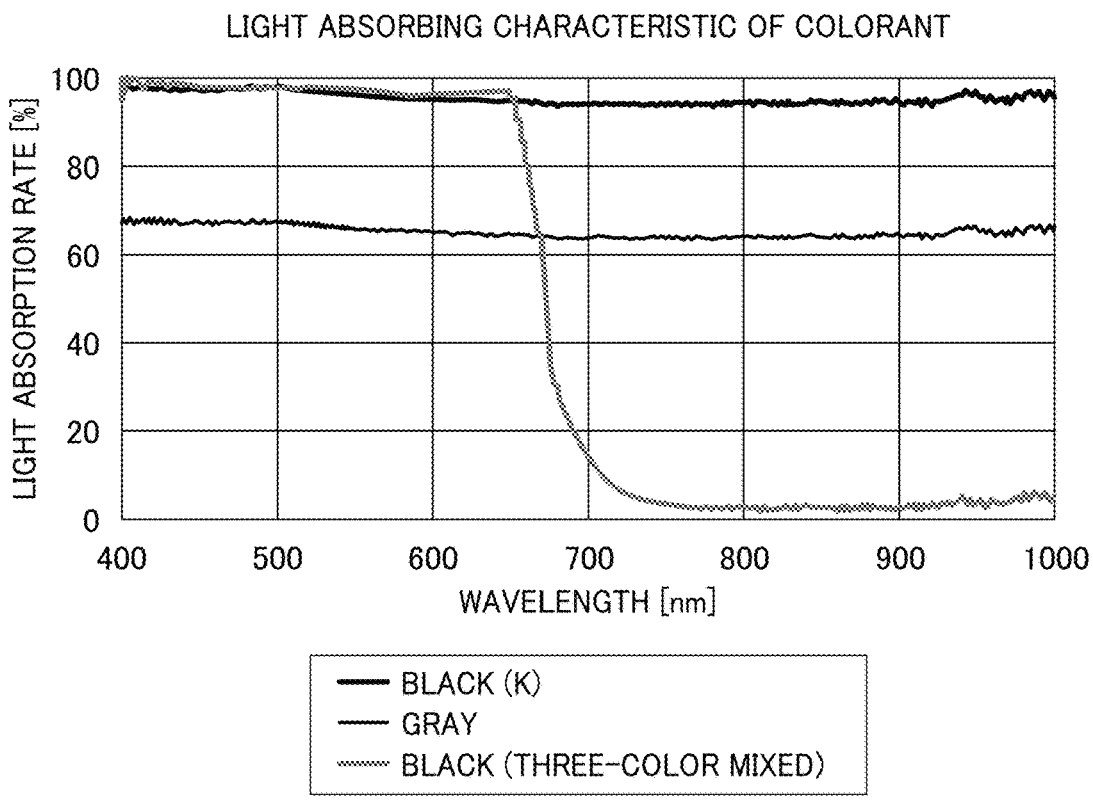
FIG. 3 is a graph illustrating an example of light absorbing characteristics of colorant.

Black ink, black toner, or a black pencil used for black characters contains carbon. Carbon absorbs light in the visible region and the infrared region. Accordingly, black print drawn thereby can be read black even in the visible region and the infrared region. On the other hand, color ink and cyan (C), magenta (M), and yellow (Y) color toners allow transmission of light in the infrared region. This feature is illustrated in FIG. 3. The horizontal axis represents the wavelength of light, and the vertical axis represents the absorption rate of light. In FIG. 3, "black" refers to a color of a material containing carbon as described above, "gray" refers to a color printed with gray ink or black toner with thinning-out, and black (three-color mixed) refers to a black color produced by mixing C, M, and Y colors (hereinafter also referred to as color-mixed black). Since the color-mixed black absorbs light in the visible region but allows transmission of light in the near-infrared region, the color-mixed black can be read as white of white paper in the near-infrared region. In this disclosure, a portion (pixel) in which the absorption rate is equal to or greater than a predetermined value over the visible region and the invisible region (near-infrared region) is defined as a "designated region." As an example, a region of a color (pixel) having an absorption rate of 40% or more is set as a designated region (black print region).

Figure 4:
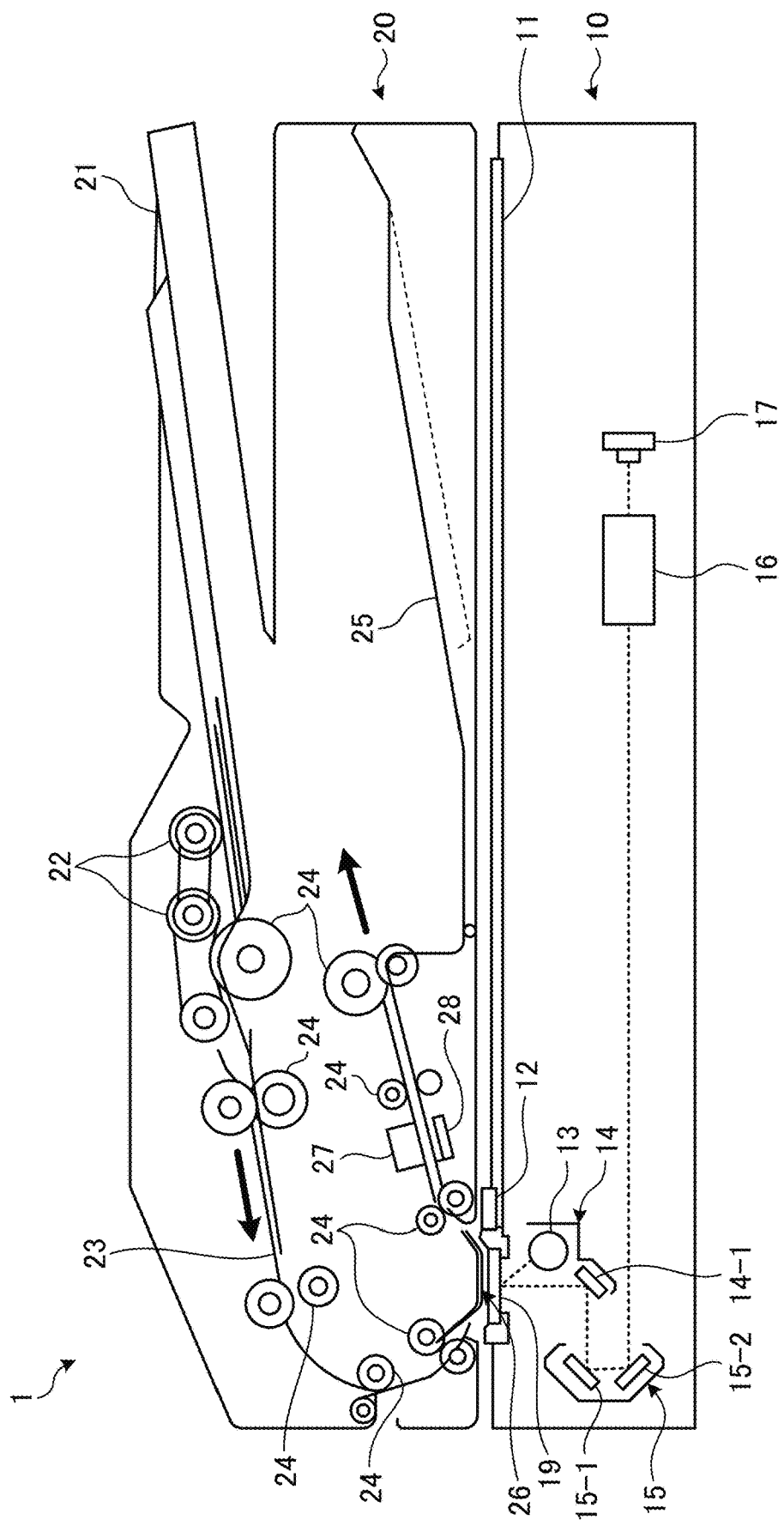
FIG. 4 is a diagram illustrating a configuration of a scanner according to Embodiment 1.

FIG. 4 is a diagram illustrating a configuration of the scanner. A scanner 1 illustrated in FIG. 4 includes an exposure glass 11 on an upper surface of a scanner body 10 and an imaging device 40 (see FIG. 5) inside the scanner body 10. For example, a light source unit 13, a first carriage 14, a second carriage 15, a lens unit 16, and an image sensor 17 are disposed inside the scanner body 10. The first carriage 14 includes the light source unit 13 and a reflection mirror 14-1. The second carriage 15 includes reflection mirrors 15-1 and 15-2. The scanner body 10 also includes a control board 300 (controller) illustrated in FIG. 5 that controls the entire operation of the scanner 1.

The control board 300 controls the light source unit 13 to emit light while moving the first carriage 14 and the second carriage 15, and sequentially reads reflected light from a target of reading, placed on the exposure glass 11 by an image sensor 17. When the light source unit 13 emits light, the light reflected by the target of reading is reflected by the reflection mirror 14-1 of the first carriage 14 and the reflection mirrors 15-1 and 15-2 of the second carriage 15 to enter the lens unit 16. The light emitted from the lens unit 16 forms an image on the image sensor 17. The image sensor 17 receives reflected light from a target of reading and outputs an image signal. The image sensor 17 is an image sensor employing, for example, a charge coupled device (CCD) or a complementary metal oxide semiconductor (CMOS), and serves as a reading element to read an image to be read.

Figure 6:
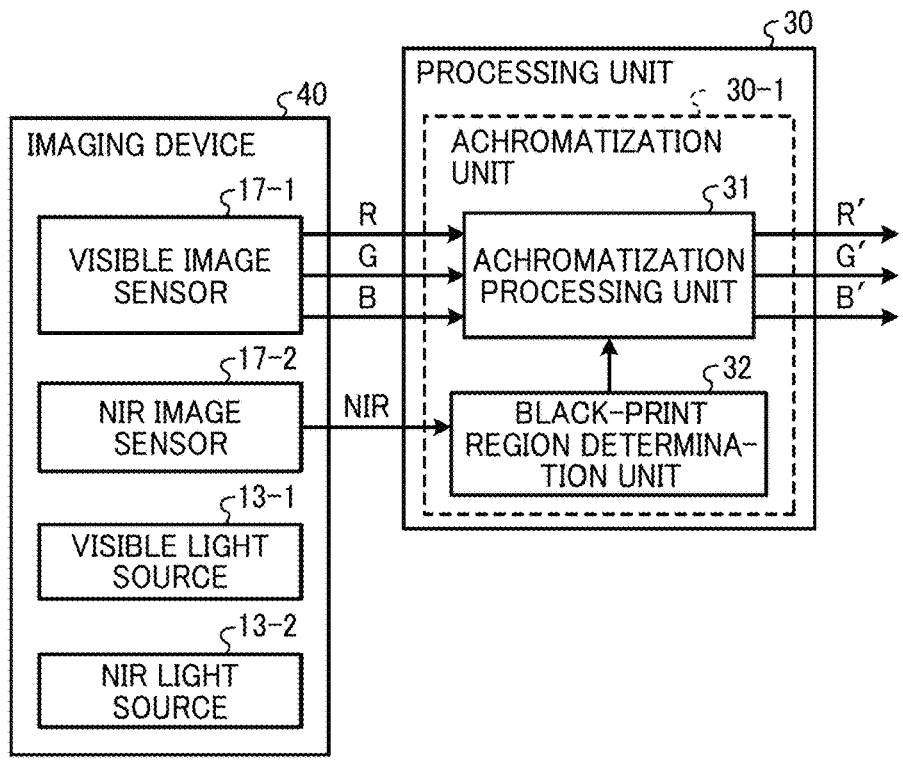
FIG. 6 is a diagram schematically illustrating a configuration to correct a black character in shadow removal according to Embodiment 1.

The light source unit 13 includes a visible light source 13-1 and an NIR light source 13-2 as illustrated in FIG. 6. The image sensor 17 includes a first image sensor and a second image sensor. The first image sensor receives reflected light of visible light emitted to the target of reading and outputs an image. The second image sensor receives reflected light of NIR light emitted to the target of reading and outputs an image. An image received when a target of reading is irradiated with visible light is referred to as a visible image, and an image received when the target of reading is irradiated with NIR light is referred to as a NIR image. Although the visible light source and the NIR source are separately provided, the visible light source may be integral with the NIR light source as a single light source.

The first image sensor and the second image sensor may be individual image sensors, or implemented by one image sensor as long as the first image sensor and the second image sensor can output the visible image and the NIR image, respectively.

The reference white plate 12 is a reference used for white correction. The reference white plate 12 has a predetermined reflectance and is read in advance for white correction of a read image.

The scanner 1 illustrated in FIG. 4 is equipped with an automatic document feeder (ADF) 20. When one side of the ADF 20 is lifted up, the ADF 20 is opened upward to expose the surface of the exposure glass 11. The user sets a document to be read on the exposure glass 11, lowers the ADF 20, and presses the ADF 20 against the exposure glass 11 from the back side of the document. When a scan start button is pressed, the first carriage 14 and the second carriage 15 are driven to move in the main scanning direction and the sub-scanning direction, and the entire document is read.

In addition to reading the document set on the exposure glass 11, the ADF 20 is also capable of reading a document by a sheet-through method. In the ADF 20, a pickup roller 22 separates a stack of documents to be read one by one from a tray 21 in the ADF 20. The ADF 20 reads one side or both sides of the document conveyed along a conveyance path 23 and ejects the document to an output tray 25 while controlling various conveyance rollers 24.

Reading of a document by the ADF 20 in the sheet-through method is performed through a reading window 19. In this example, the first carriage 14 and the second carriage 15 are moved to a home position and kept at the home position when the document is read. When the document passes between the reading window 19 and a background reference 26, the first side (front side) of the document facing the reading window 19 is irradiated with light from the light source unit 13, and the document is read (read image is obtained). The reading window 19 is a slit-shaped window in a part of the exposure glass 11. The background reference 26 is a background member (e.g., a plate or wall).

When the ADF 20 performs double-sided reading, after the document passes through the reading window 19, a reading module 27 of a second reading unit provided on the back side of the document reads the second side (back side) of the document. The reading module 27 includes an irradiation unit including a light source and a contact-type image sensor serving as a second reading unit. The contact-type image sensor reads reflected light of light emitted to the second side. This light source may also include a visible light source and a NIR light source so that a visible image and a NIR image can be read. The background reference 28 is a density reference and, for example, a plate (or wall) having a predetermined color such as white.

Next, a configuration of a control block of the scanner 1 will be described.

Figure 5:
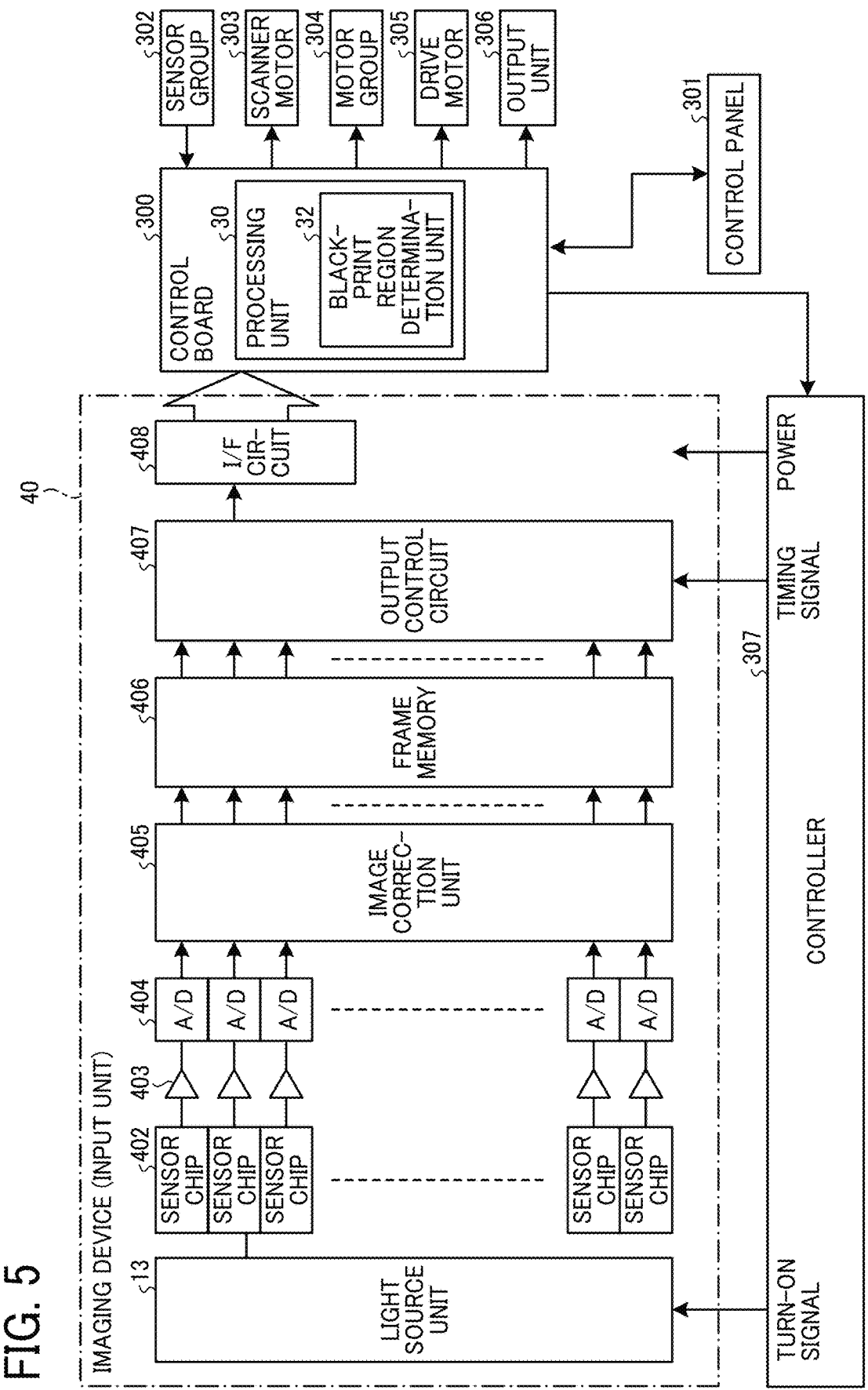
FIG. 5 is a diagram illustrating an example of a configuration of a control block of the scanner illustrated in FIG. 4.

FIG. 5 is a diagram illustrating an example of a configuration of a control block of the scanner 1. As illustrated in FIG. 5, the scanner 1 includes a control board 300, a control panel 301, a sensor group 302, a scanner motor 303, a motor group 304 for conveyance paths, a drive motor 305, an output unit 306, and the imaging device 40. In addition, various objects to be controlled are connected to the elements illustrated in FIG. 5. The sensor group 302 includes sensors to detect a target of reading. The scanner motor 303 drives the first carriage 14 and the second carriage 15 of the scanner body 10. The motor group 304 for conveyance paths is a group of motors for conveyance, disposed in the ADF 20. The output unit 306 is, for example, an output interface through which the output unit 4a outputs image data to an external device. The output interface may be a universal serial bus (USB) interface or a communication interface connected to a network.

The control panel 301 includes, for example, a touch panel of a liquid crystal display. The control panel 301 receives operations of input of various settings and reading execution (scan start) from a user through operation buttons, touch input, or the like, and transmits corresponding operation signals to the control board 300. The control panel 301 displays, on the display screen, various kinds of display information from the control board 300. The control panel 301 includes various setting buttons for a user, for example, to remove an imprint of a stamp on a subject, and instructs the control board 300 to perform setting in response to an input operation performed on the setting button. Whether or not to remove the stamp imprint may be selected on the setting screen of the display screen. The settings may include a setting for automatically removing the stamp imprint when the scan start button is operated. The scanner 1 may store various data used for removing the stamp imprint in an external memory or output to an external device.

The imaging device 40 corresponds to the input unit 1a in FIG. 1. The imaging device 40 includes the light source unit 13, sensor chips 402, amplifiers 403, analog-to-digital (A/D) converters 404, an image correction unit 405, a frame memory 406, an output control circuit 407, and an I/F circuit 408. Image data of an image read from a target of reading is output, for each frame, from the output control circuit 407 to the control board 300 through the I/F circuit 408. Each sensor chip 402 is a pixel sensor of the image sensor 17.

The imaging device 40 is driven by a controller 307. For example, the imaging device 40 turns on the light source unit 13 based on a turn-on signal from the controller 307 to irradiate the target of reading with visible light and NIR light at a set timing. In addition, the imaging device 40 converts the light from the target of reading, which forms an image on the sensor surface of the image sensor 17, into an electric signal by each sensor chip 402 and outputs the electric signal.

The imaging device 40 amplifies a pixel signal output from each sensor chip 402 with the corresponding amplifier 403, performs analog to digital conversion of the pixel signal with the corresponding A/D converter 404, and outputs a level signal of the pixel. The image correction unit 405 performs image correction on the signal output from each pixel. The image correction unit 405 performs, for example, shading correction on the signal output from each pixel.

After the image correction, each data is stored in the frame memory 406, and the stored read image is transferred to the control board 300 via the output control circuit 407 and the I/F circuit 408.

The control board 300 includes a central processing unit (CPU), a memory, and the like. The CPU controls the scanner 1 to perform a reading operation on a target of reading and a process such as imprint removal on a read image obtained by the reading operation.

The control board 300 includes a processing unit 30 and a black-print region determination unit 32. For example, the processing unit 30 and the black-print region determination unit 32 are functional units that are implemented by the CPU executing a predetermined program. Alternatively, these functional units may be implemented by hardware such as an application-specific integrated circuit (ASIC).

Stamp Imprint Removal

The stamp imprint removal will be described in detail. The description below concerns a configuration and a method for removing a stamp imprint from a read image using a selected color removal function for removing a specific color. The read image is obtained by scanning (reading) a document that is an example of the target of reading. Black ink, black toner, or a black pencil used for drawing black characters contains carbon. Carbon absorbs light in the infrared region. On the other hand, color ink and cyan (C), magenta (M), and yellow (Y) color toners allow transmission of light in the infrared region. Note that an object having a color (e.g., C, M, or Y) other than black may be referred to as "color . . . ," such as color ink and color toner. Color ink, color toner, and the like may be referred to as "color component."

Therefore, when a target of reading (a paper medium) is irradiated with NIR light and read to obtain a NIR image, the NIR light penetrates an image area formed with a color component on the paper medium and is reflected by the paper medium. Accordingly, the color of the paper medium is read as a bright color such as white having a large brightness value.

On the other hand, a black print area absorbs both visible light and NIR light. Since NIR light is absorbed in the black-print region, the amount of reflected light is small. The black-print region is read as black having a small brightness value. In a black-print region overlapped with a stamp imprint, NIR light is transmitted through the stamp imprint but is absorbed by the black print therein. Therefore, even if the color is reddish under visible light, the color is read as black in the NIR image. In addition, a portion of the black-print region not overlapped with the stamp imprint is read as black even by visible light.

FIG. 6 is a diagram schematically illustrating a configuration to correct a black character in shadow removal. The imaging device 40 includes the visible light source 13-1, a visible image sensor 17-1, the NIR light source 13-2, and a NIR image sensor 17-2. The imaging device 40 irradiates a target of reading with light from the visible light source 13-1, receives reflected light from the target of reading with the visible image sensor 17-1, and outputs a visible image, which is, for example, a red-green-blue (RGB) image. In addition, the imaging device 40 irradiates the same target of reading with light from the NIR light source 13-2, receives reflected light from the target of reading with the NIR image sensor 17-2, and outputs an NIR image. The imaging device 40 can simultaneously read both a visible image and a NIR image from the same target of reading. Note that when the target of reading is the same, the imaging device 40 does not need to read both the visible image and the NIR image at the same time, and may read the visible image and the NIR image at different timings as long as the positions of the respective imaging targets match.

The processing unit 30 includes an achromatization processing unit 31 and the black-print region determination unit 32. The achromatization processing unit 31 and the black-print region determination unit 32 are illustrated as being combined into an achromatization unit 30-1. In this configuration, the achromatization processing unit 31 of the processing unit 30 corresponds to the image processing unit 2a (see FIG. 1), and the black-print region determination unit 32 corresponds to the determination unit 3a (see FIG. 1).

The achromatization unit 30-1 receives the visible image and the NIR image captured by the imaging device 40. The black-print region determination unit 32 determines a black-print region from the NIR image and outputs the position of the pixel of the determined black-print region to the achromatization processing unit 31. The achromatization processing unit 31 achromatizes a color pixel at the position on the visible image corresponding to the pixel position in the black-print region determined by the black-print region determination unit 32 and outputs an image R'G'B' in which target color pixels are achromatized as the image data D3. The image data D3 is for displaying the portion corresponding to the black-print region in black. The image R'G'B' corresponds to a first processed image.

The RGB image includes a R component image, a G component mage, and a B component image, and the achromatization processing unit 31 performs achromatization on each of the R component image, the G component mage, and the B component image to achromatize pixels of the target color. The image R'G'B' includes an achromatized R component image R', an achromatized G component image G', and an achromatized B component image B'.

In this disclosure, a pixel corresponding to a chromatic color (other than achromatic colors) is called a color pixel. When a black-character portion is overlapped with a stamp imprint, the color tone of the black-character portion changes. By achromatizing the color pixel, the black-character portion whose color has changed is restored to black. As a result, in the black-print region, a portion overlapped with a stamp imprint and a portion not overlapped with the stamp imprint can be restored to black without interruption.

Figure 7:
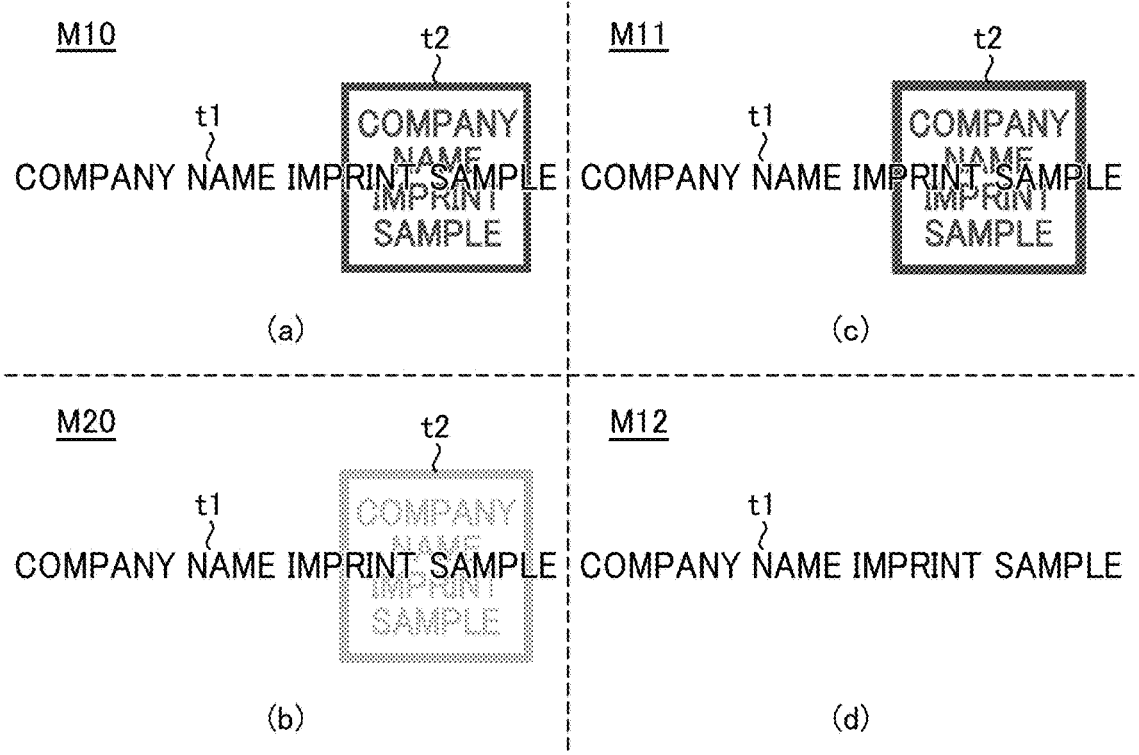
FIG. 7 is a diagram illustrating an image to be processed by an achromatization unit according to Embodiment 1.

FIG. 7 is a diagram illustrating an image to be processed by the achromatization unit 30-1. As an example, the target of reading in this case is a document in which a vermilion stamp imprint overlaps a part of a black character "company name imprint sample."

A part (a) of FIG. 7 illustrates a visible image M10 input to the achromatization unit 30-1. The visible image M10 represent the state of the original document viewed with human eyes under visible light. That is, a vermilion stamp imprint t2 remains overlapping a portion of a black character string t1 "company name imprint sample," and the portion of the black-print region overlapped with the stamp imprint t2 is colored vermilion by the stamp imprint t2. In this state, when OCR is performed, it is possible that some of characters of the "company name imprint sample" are not discriminated.

A part (b) of FIG. 7 illustrates an NIR image M20 input to the achromatization unit 30-1. In the NIR image M20, the black character string t1 "company name imprint sample," which is the same as the black character string of the visible image M10, is displayed in black and in a floating manner. The black-character portion overlapped with the stamp imprint t2 is caused to float in black like other black-character portions by the irradiation of the NIR light. By using the NIR image M20, the black-print region determination unit 32 can also determine the black-character portion overlapped with the stamp imprint t2 as a black-print region in the same manner as other black-character portions.

A part (c) of FIG. 7 illustrates a first processed image M11 (image after achromatization) obtained by achromatizing the vermilion-colored pixels in the black-print region of the black character string t1 "company name imprint sample" overlapped with the stamp imprint t2 in the visible image M10. In the visible image M10, the portion of the black character string t1 "company name imprint sample" overlapped with the stamp imprint t2 is colored vermilion. by contrast, in the first processed image M11, the achromatization restores the portion overlapped with the stamp imprint t2 to black, so as to be continuous with the portion not overlapped with the stamp imprint t2 in the black character string t1 "company name imprint sample."

A part (d) of FIG. 7 illustrates an image M12 from which the stamp imprint is removed by removing the specific color using the first processed image M11. By removing the vermilion color, the stamp imprint t2 is removed, but the black character string t1 "company name imprint sample" remains clearly without blurring or loss.

Figures 24A, 24B, 24C:
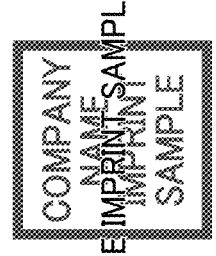
FIGS. 24A to 24C are diagrams illustrating removal of a specific color by a related art.

By contrast, when a specific color is removed by a related art, blurring or loss is caused in the black character string "company name imprint sample," and OCR recognition of that portion is difficult (see FIGS. 24A to 24C).

As described above, in the present embodiment, the achromatization processing unit 31 and the black-print region determination unit 32 are provided, so as to determine a black-print region from a NIR image obtained by, for example, simultaneous reading with a visible image, and achromatize a color pixel on the visible image at the same position as the position of the determined black-print region.

Thus, although the black-character portion overlapped with the stamp imprint is also colored with the specific color, the black character colored by the overlapping of the stamp imprints can be restored to black. This can prevent the inconvenience that the black-character portion is removed together when the stamp imprint is removed with the specific color.

Accordingly, the image data for displaying the designated color in the visible image can be provided. This configuration can prevent blurring or loss of the black character even when the stamp imprint is removed by removing the specific color in the post-stage processing. Therefore, the OCR recognition rate can also be improved.

Modification 1 of Embodiment 1

A description is given of a case where an achromatized RGB image is output to an external device outside the scanner 1. The description below focuses on the differences from the above-described embodiment to avoid redundancy, and the same applies to other embodiments and modifications to be described later.

The connection between the scanner 1 and the external device may be wired or wireless. The scanner 1 may be connected to the external device by a connection cable such as a USB cable or by a communication interface via a communication network.

The external device is, for example, an information processing apparatus having a computer configuration such as a personal computer operated by a user, or a server. The external device includes a CPU. For example, the CPU executes a prescribed program, to remove a stamp imprint from an achromatized RGB image and to perform OCR processing. The output unit 306 (see FIG. 5) outputs the data to the external device.

Figure 8:
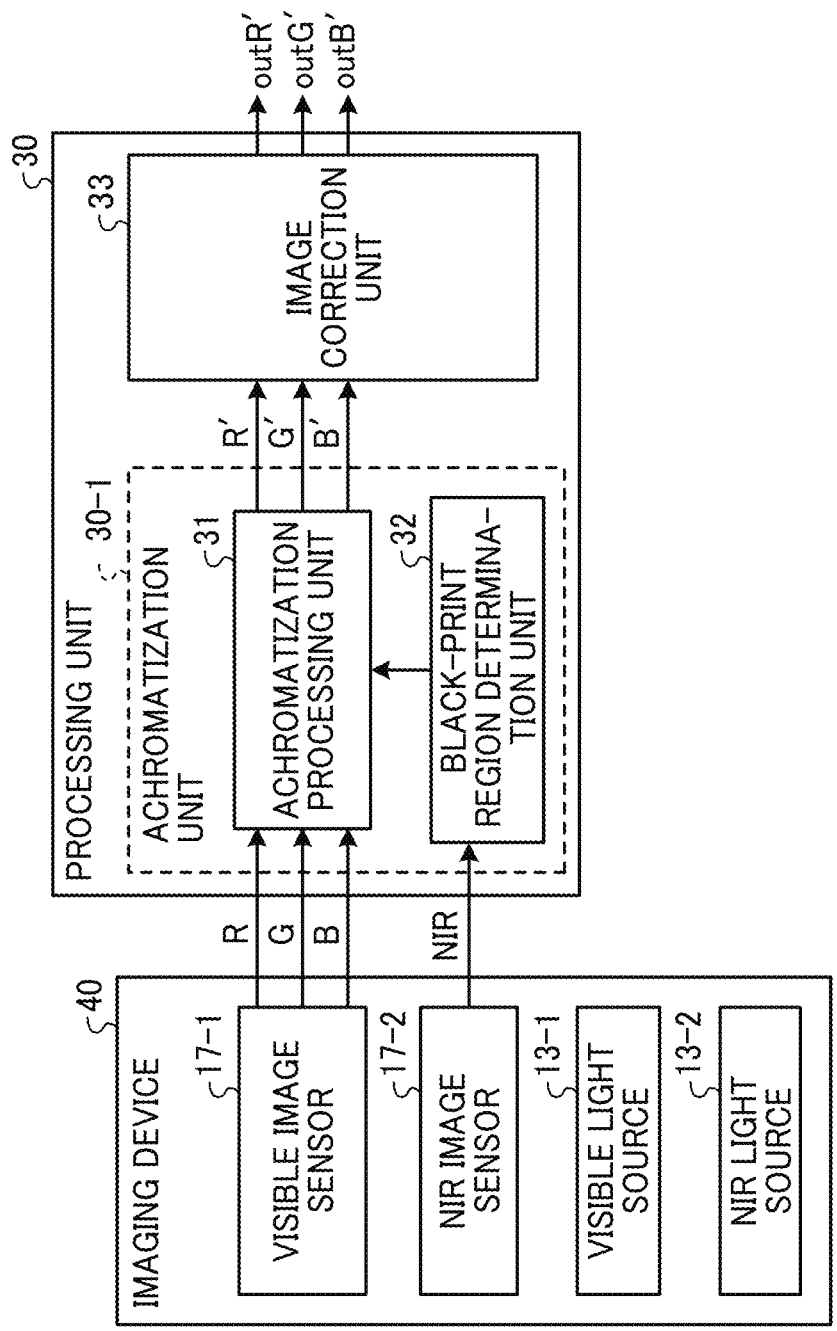
FIG. 8 is a block diagram illustrating an example of a scanner according to Modification 1.

FIG. 8 is a block diagram illustrating an example of a scanner according to Modification 1. The processing unit 30 includes an image correction unit 33. The image correction unit 33 performs filter processing, color correction processing, and the like on the image R'G'B' output from the achromatization unit 30-1, and outputs, to an external device, an image outR'G'B' after image processing. The image output to the external device is data before the stamp imprint is removed by the removal of the specific color.

As described above, in the configuration of Modification 1, the scanner 1 can output the image outR'G'B' which can be handled in the same manner as a normal RGB scanner image. In the image outR'G'B', the achromatization of the black-character portion overlapped with the stamp imprint has been performed. Accordingly, even when the external device in the subsequent stage performs post-processing, the external device can handle the image outR'G'B' in the same manner as a normal RGB scanner image such as a document image without a stamp imprint. In addition, since the image outR'G'B' has a quality comparable to that of a normal RGB scanner image in appearance, the image outR'G'B' can be used as an image to be stored.

The image outR'G'B' is also advantageous in a case where the external device performs OCR as the post-processing. Since the black-character portion overlapped with the stamp imprint has been achromatized, even after the stamp imprint is removed by the removal of the specific color, the characters are less likely to be blurred or missing. Thus, erroneous recognition of OCR can be prevented.

Modification 2 of Embodiment 1

Figure 9:
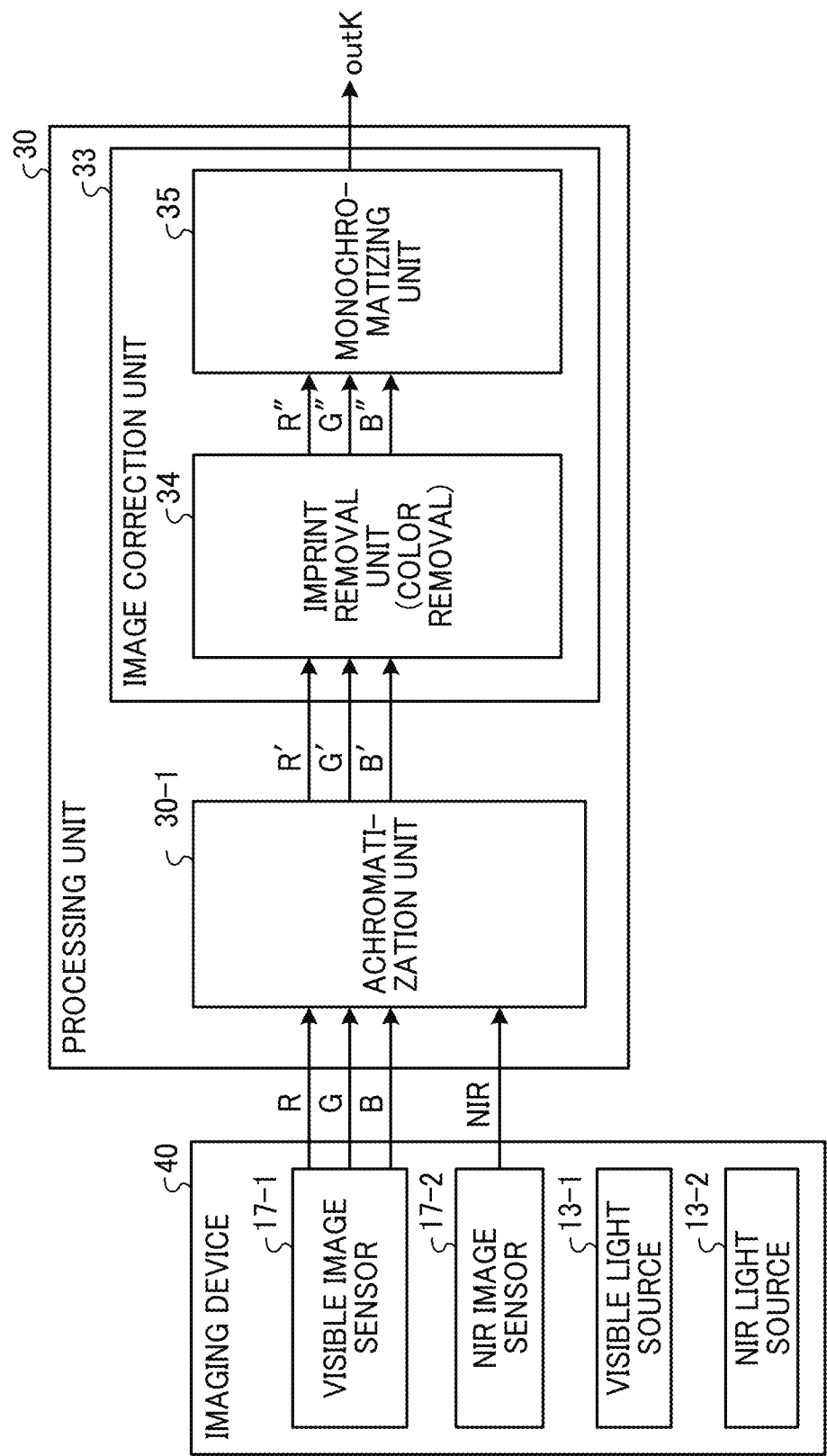
FIG. 9 is a block diagram illustrating an example of a scanner according to Modification 2.

A description is given of a configuration for outputting an achromatized RGB image to the outside as an image dedicated to OCR. FIG. 9 is a block diagram illustrating an example of a scanner according to Modification 2.

As illustrated in FIG. 9, the image correction unit 33 includes an imprint removal unit 34 and a monochromatizing unit 35. The imprint removal unit 34 removes a stamp imprint by removing a specific color from the image R'G'B' on which the achromatization has been performed, thereby generating an image R"G"B". The monochromatizing unit 35 performs a black (K) monochromatizing process on the image R"G"B" from which the stamp imprint has been removed so as to facilitate OCR recognition. The image correction unit 33 output, to the outside, an image outK after monochromatization. The image after monochromatization corresponds to a "second processed image."

In the configuration of Modification 2, in the same system, the imprint removal can be performed on the achromatized image R'G'B' by using an optimum removal parameter. Accordingly, a removal parameter that facilitates color determination can be used on the assumption that, for example, black characters are achromatized, and a slightly dim stamp imprint can be subjected to the removal processing. Therefore, in the configuration of Modification 2, the accuracy of removing the stamp imprint is improved.

Modification 3 of Embodiment 1

When a business form is subjected to OCR, there is a case where the original form is stored as evidence. In such a case, information such as a stamp imprint on the form is also kept. Since unnecessary information other than characters are removed in the processing for optimizing OCR, the image having been subjected to such processing is not suitable as an image to be stored as evidence.

Therefore, in Modification 3, in addition to an image monochromatized for OCR output in Modification 2, the original image not subjected to the processing for optimizing OCR can be output.

Figure 10:
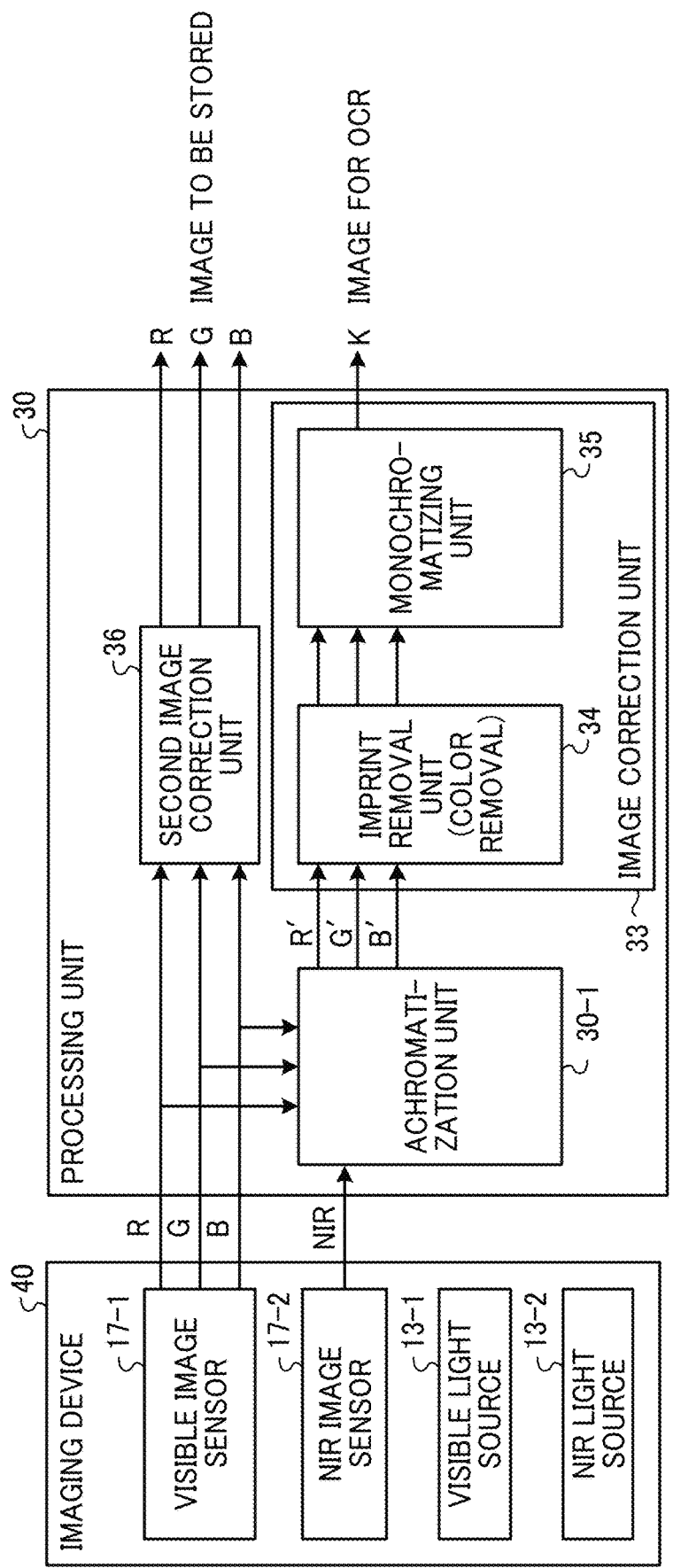
FIG. 10 is a block diagram illustrating an example of a scanner according to Modification 3.

FIG. 10 is a block diagram illustrating an example of a scanner according to Modification 3. As illustrated in FIG. 10, the RGB image output from the visible image sensor 17-1 is input to both a second image correction unit 36 for outputting an image to be stored and an OCR-optimized image processing unit (the achromatization unit 30-1 and the image correction unit 33) for outputting the image for OCR. The second image correction unit 36 performs, on the RGB image output from the visible image sensor 17-1, image correction to output the RGB image to be stored. Since the configuration of the OCR-optimized image processing unit is the same as the configuration including the achromatization unit 30-1 and the image correction unit 33 illustrated in FIG. 9, the description thereof will be omitted.

The configuration of Modification 3 outputs both the image to be stored (image data to be stored) and the image for OCR (image data for OCR) in one reading operation for one target of reading. As a result, the user can obtain both the image to be stored and the image for OCR by operating a PC or the like. This configuration saves the user the trouble of obtaining the image to be stored and the image for OCR individually.

Although the achromatization unit 30-1 and the image correction unit 33 illustrated in FIG. 9 are adopted as the OCR-optimized image processing unit in FIG. 10, this is merely an example. Alternatively, as the OCR-optimized image processing unit, for example, the configuration illustrated in FIG. 8 may be adopted to output the image outR'G'B'. The image outR'G'B' is an image having been subjected to the achromatization process but not having been subjected to the removal of the specific color.

(Example of Modification 3)

Figure 11:
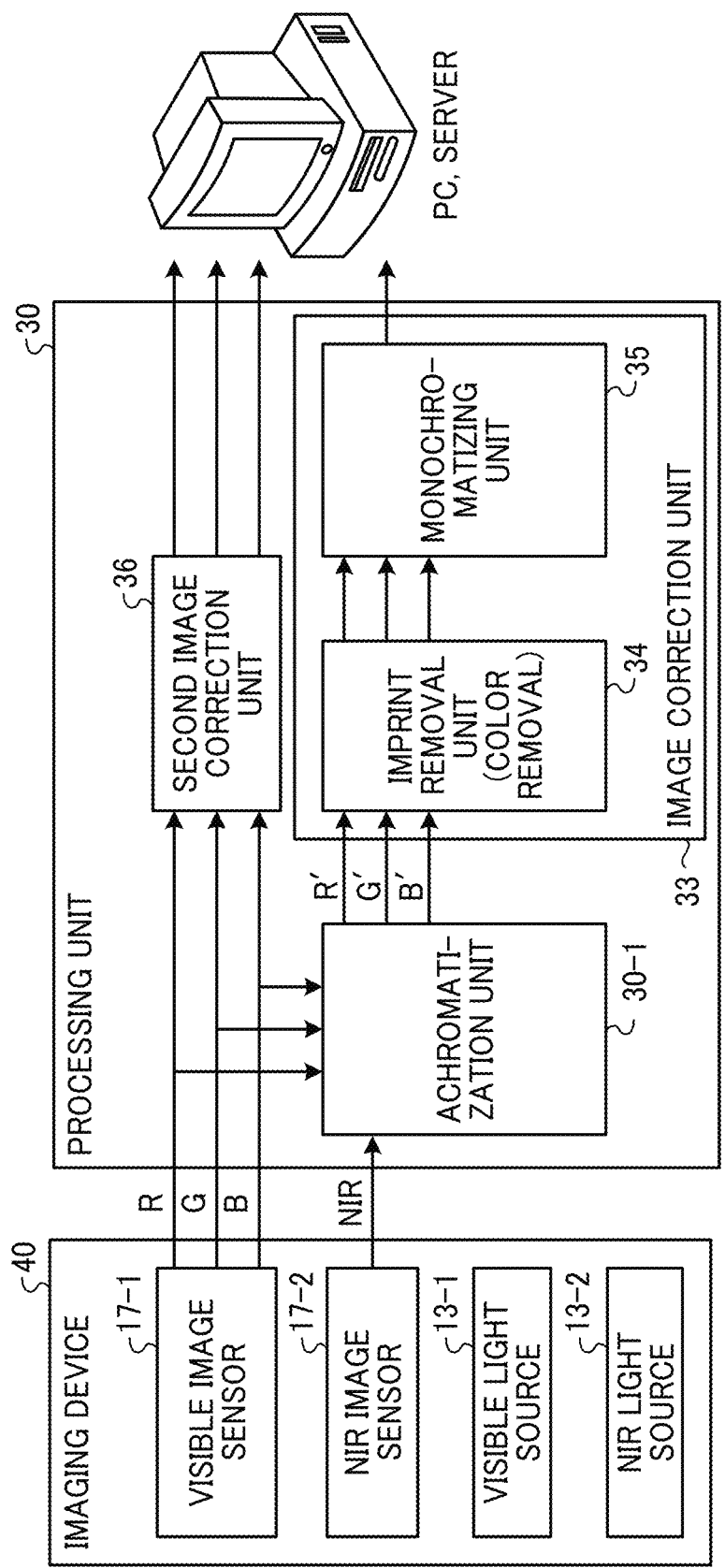
FIG. 11 is a diagram illustrating an example to which Modification 3 is applied.

Next, an example to which Modification 3 is applied will be described. FIG. 11 illustrates a data management system to which the configuration illustrated in FIG. 10 is applied. The PC or the server includes a storage device, and stores, as one set, the image data to be stored and the image data for OCR transmitted from the processing unit 30. The image data to be stored and the image data for OCR are stored in a common storage device with names associated with each other so as to indicate the relationship between the image data to be stored and the image data for OCR. This data management system can prevent loss of the image data which is the original of the image data for OCR. Since a single data management system manages both data, data management is facilitated.

Modification 4 of Embodiment 1

Next, as Modification 4, a description will be given of a modification of the determination method performed by the black-print region determination unit in a case where the stamp imprint appears faintly in the NIR image.

Figure 12A:
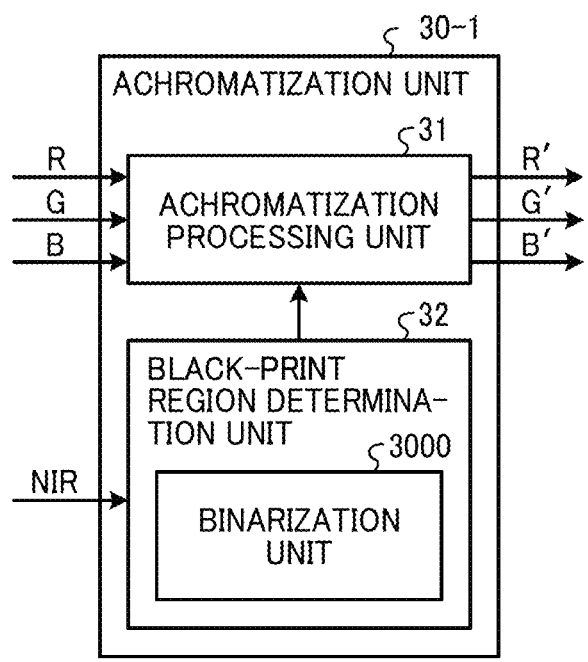
FIG. 12A is a diagram illustrating a configuration of a black-print region determination unit according to Modification 4.
Figure 12B:
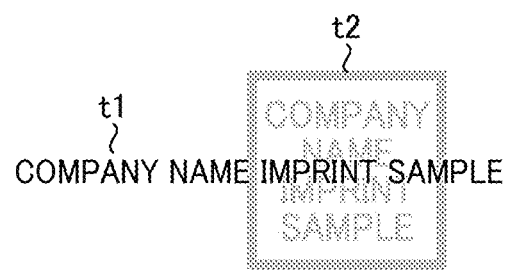
FIG. 12B is illustration of an example of an NIR image in which a stamp imprint appears faintly.

FIG. 12A is a diagram illustrating the black-print region determination unit 32 according to Modification 4. As illustrated in FIG. 12A, the black-print region determination unit 32 includes a binarization unit 3000. FIG. 12B is illustration of an example of an NIR image in which the stamp imprint appears faintly. As illustrated in FIG. 12B, in the NIR image, the stamp imprint t2 appears faintly. As described above, since NIR light is absorbed in the black-character portion and the amount of light received by the NIR sensor is small, the black-character portion is represented in black. On the other hand, a color portion, such as a stamp imprint, may be represented by light gray as illustrated in FIG. 12B because the color portion has a small absorption characteristic although the amount of absorption of NIR light is small.

In such a case, it is difficult to determine the black-print region t1 in the NIR image. Therefore, binarization processing is performed. The binarization unit 3000 illustrated in FIG. 12A compares the pixel values of an input infrared image with a threshold value and performs binarization processing. In the binarization processing, a pixel having a pixel value closer to black is determined as a black pixel and a pixel having a value closer to white is determined as a non-black pixel. Since the pixels of the stamp imprint t2 are not white, the threshold is set to a value between the pixel value of the black-print region t1 and the pixel values of the stamp imprint t2 so that the pixels consisting of the stamp imprint t2 are classified into a non-black print region. This threshold value can also be used to distinguish three-color mixed black.

The black-print region determination unit 32 performs the binarization processing in this way and outputs the determination result of the black pixels and the non-black pixels to the achromatization processing unit 31.

As described above, when the binarization processing is used in the black-print region determination, it is easy to separate the black-character portion from the color portion such as the stamp imprint.

Modification 5 of Embodiment 1

Next, a description is given of Modification 5 in which the black-print region determination unit performs threshold value determination.

Figure 13:
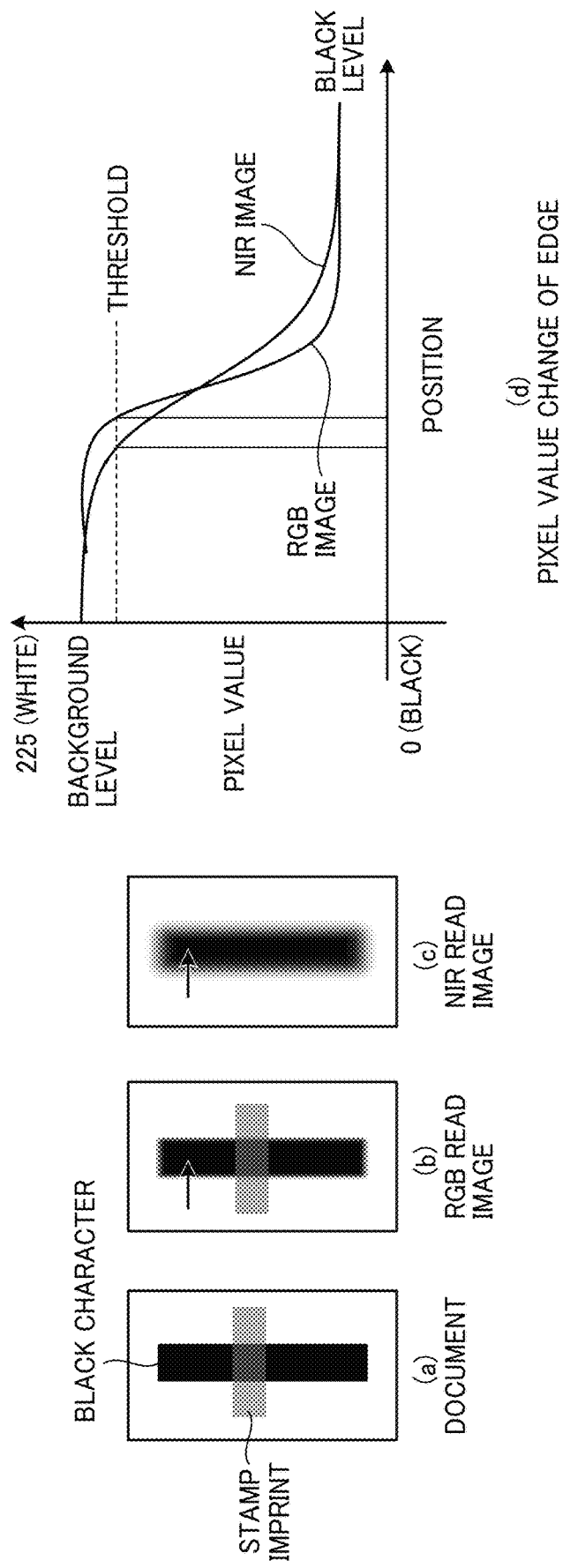
FIG. 13 is a diagram illustrating threshold value determination by a black-print region determination unit according to Modification 5.
Figure 14B:
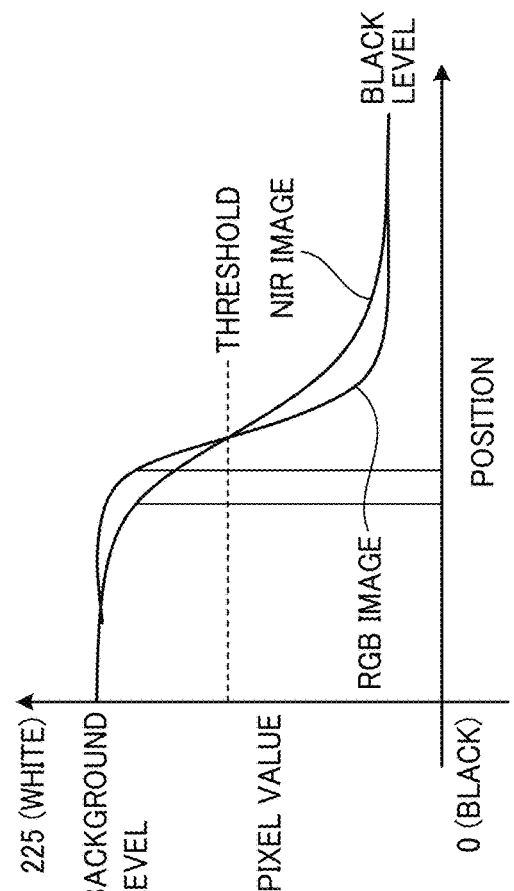
FIG. 14B is an example of a graph of edge change from a background level to a black level.

FIGS. 13 to 14B are diagrams illustrating a configuration for the black-print region determination unit 32 to determine a threshold value according to Modification 5.

A part (a) of FIG. 13 illustrates an example of a document in which a black character overlaps a stamp imprint. An overlapping portion between the black character and the stamp imprint is enlarged. A part (b) of FIG. 13 is an image of an RGB visible image of the document illustrated in part (a) of FIG. 13, and part (c) of FIG. 13 is an NIR image of the document illustrated in part (a) of FIG. 13.

In the scanner 1, both the RGB image and the NIR image are read by the same optical system (lens, mirror, or the like). For this reason, when adjustment is performed in accordance with the image quality of the RGB image, as illustrated in the parts (b) and (c) of FIG. 13, the NIR image is more blurred compared with the RGB image.

That is, as illustrated in part (d) of FIG. 13, when pixel value changes in the vicinity of an edge of the black character are observed, the NIR image exhibits a blunter change in pixel value than the RGB image. In this case, when the threshold value for binarization for black-print region determination in the NIR image is set in the vicinity where a change from the background level of the document occurs, it can be seen that the position of the edge of the black character is shifted between the NIR image and the RGB image. In the NIR image, the region of the black character is determined to be thick. As a result, there is a risk of achromatizing a part of the stamp imprint outside the edge of the region of the black character in the RGB image.

Figure 14A:
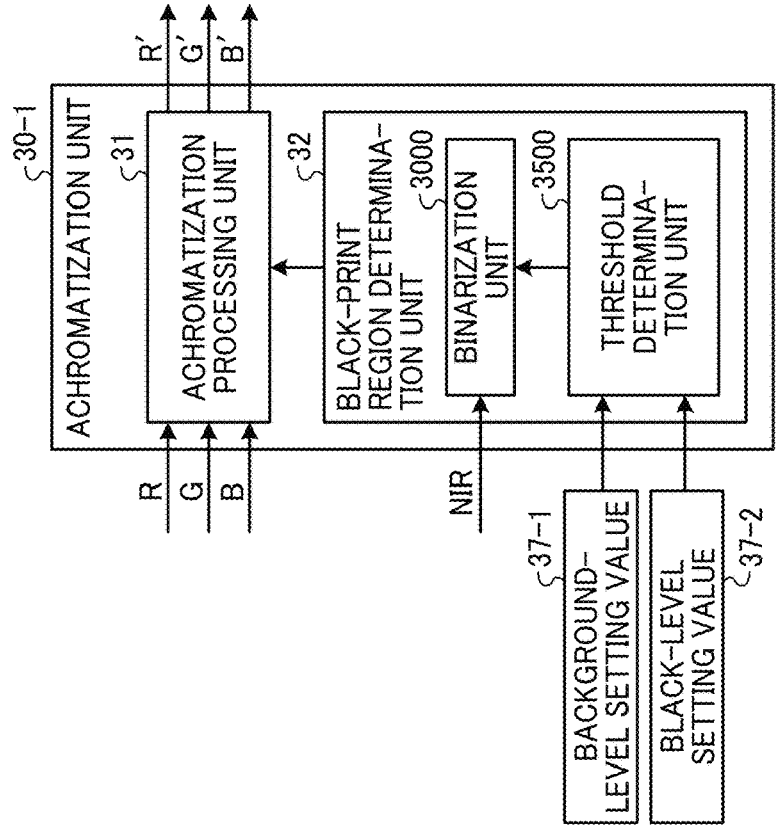
FIG. 14A is a diagram illustrating a configuration for the threshold value determination by the black-print region determination unit according to Modification 5.

Therefore, as illustrated in FIG. 14A, a background-level setting unit 37-1, a black-level setting unit 37-2, and a threshold determination unit 3500 are provided.

In the system, the set values of the background level and the black level are stored in advance as the user interface (UI) setting values or the design values, and the threshold determination unit 3500 determines the threshold value based on the set values of the background-level setting unit 37-1 and the black-level setting unit 37-2.

As illustrated in FIG. 14B, in the edge change from a certain background level to a certain black level, in an intermediate region of the level change amount between the background level and the black level, the edge change is at a constant position regardless of the degree of blur of the image. Therefore, setting the threshold value to an intermediate value between the background level and the black level can minimize the error between the position of the black-print region determined in the NIR image and the position of the black-print region in the RGB image having a different degree of blur.

Modification 6 of Embodiment 1

Next, a description is given of, as Modification 6, another modification in which the black-print region determination unit performs threshold value determination. In Modification 5, the threshold value is determined based on the setting value set from the UI or the design value. However, the background level and the black level of characters vary depending on the input image. Even in a single sheet of document, the color and the density of the background, and the density of black characters may vary depending on the position. In a case where the background level is darker than the assumed level, the background is determined as a black character by the determination using the preset value. Therefore, in Modification 6, the system automatically detects the background level and the black level from the image and determines the threshold value.

Figure 15:
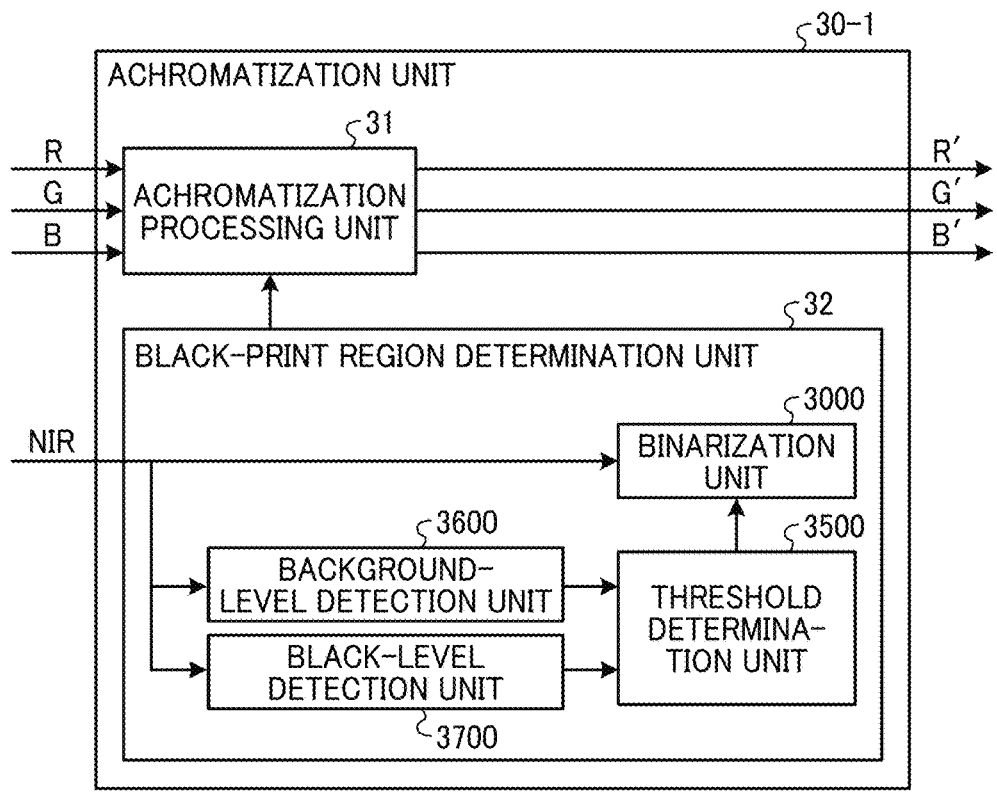
FIG. 15 is a block diagram illustrating a configuration of a black-print region determination unit according to Modification 6.

FIG. 15 is a block diagram illustrating a configuration of the black-print region determination unit 32 according to Modification 6. As illustrated in FIG. 15, the black-print region determination unit 32 includes a background-level detection unit 3600 and a black-level detection unit 3700.

The background-level detection unit 3600 sets a pixel of attention in the NIR image, refers to pixels around the pixel of attention in a certain range, and detects a background level around the pixel of attention.

The black-level detection unit 3700 refers to pixels around the pixel of attention in a certain range, and detects the black level of a black character present near the pixel of attention.

The threshold determination unit 3500 determines the threshold value using the background level and the black level detected by the background-level detection unit 3600 and the black-level detection unit 3700. The binarization unit 3000 performs binarization using the threshold value.

In this configuration, the background level and the black level are detected for each input image. Accordingly, even when the background level and the black level of characters vary depending on the input image, binarization can be performed with a threshold value appropriate for the input image.

In this configuration, the background level and the black level may be detected for each unit area of single image sheet. The unit area may be set empirically by design or set by the user. By performing the binarization for each area in this way, threshold value optimum for each area can be used in the binarization, and the black-print region can be extracted with high accuracy.

Modification 7 of Embodiment 1

Next, a description is given of an example of processing performed by the achromatization processing unit 31 as a Modification 7.

Figure 16:
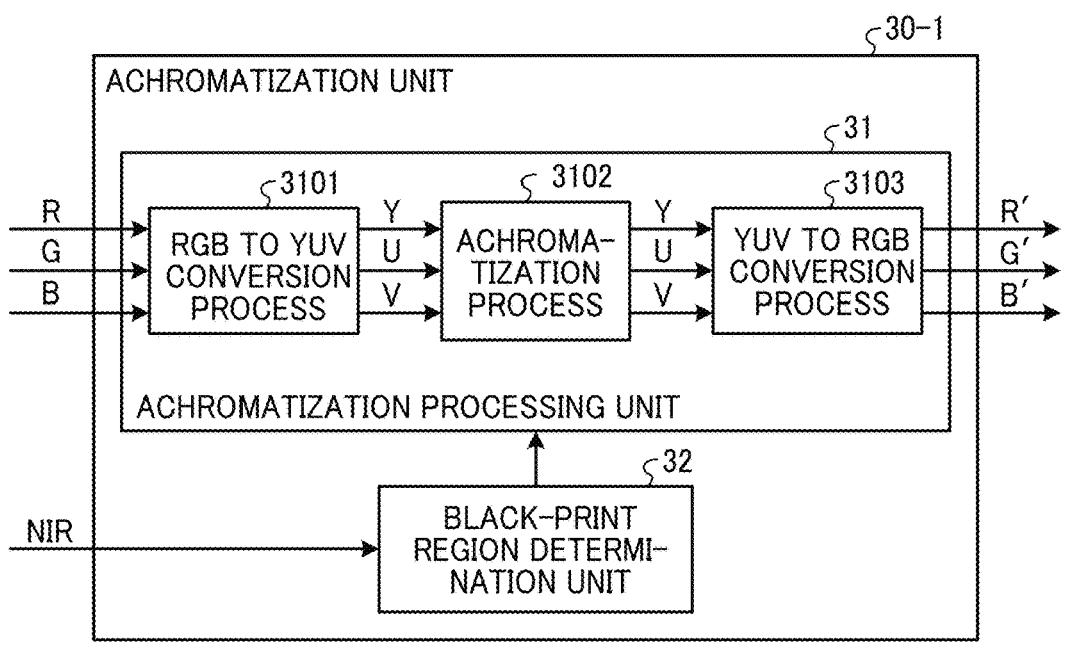
FIG. 16 is a block diagram illustrating an example of processes performed by an achromatization processing unit according to Modification 7.

FIG. 16 is a block diagram illustrating an example of processes performed by the achromatization processing unit 31 according to Modification 7. As illustrated in FIG. 16, the achromatization processing unit 31 performs an RGB to YUV conversion process 3101 (conversion of RGB color space to YUV color space), an achromatization process 3102, and a YUV to RGB conversion process 3103. In this disclosure, the RGB to YUV conversion process 3101 corresponds to a brightness and color difference conversion unit, and the YUV to RGB conversion process 3103 corresponds to an RGB conversion unit. The achromatization process 3102 corresponds to an adjustment unit.

The RGB to YUV conversion process 3101 converts the input RGB image (RGB image signal) into a YUV signal (brightness and color difference signal).

In the achromatization process 3102, the input YUV signal is corrected for the pixel at the position of the black-print region with reference to the result of the black-print region determination, and achromatization is performed as an adjustment process for displaying, in the designated color, the portion of the visible image data corresponding to the designated region of the invisible image data. On the other hand, the pixels at the positions of the non-black print region are output without being achromatized.

The YUV to RGB conversion process 3103 performs conversion of returning the YUV signal after the achromatization to RGB image signal, and outputs an image R'G'B' after the achromatization to a subsequent stage.

Calculation Example

An example of calculation performed by the achromatization processing unit 31 will be described below.

Black-print region: $out\_Y=in\_Y, out\_U=0, out\_V=0$

Non-black print region: $out\_Y=in\_Y, out\_U=in\_U, out\_V=in\_V$

In this processing, a RGB image signal is once converted into a brightness and color difference signal such as that of YUV color space, which enables achromatizing of the chroma components while keeping the brightness component (brightness signal). This processing enables achromatization of the input image while maintaining the darkness of the black characters.

Although an example of conversion into a YUV signal has been described, the conversion is not limited thereto. The format may be other than YUV, for example, YCbCr or the like, as long as processing can be performed with an image having been subjected to brightness and color difference conversion.

Adjustment of Brightness Component

A description is given of brightness component adjustment in the achromatization process 3102. The achromatization processing unit 31 may switch the brightness component in accordance with a setting from the user when performing the achromatization.

Figure 17:
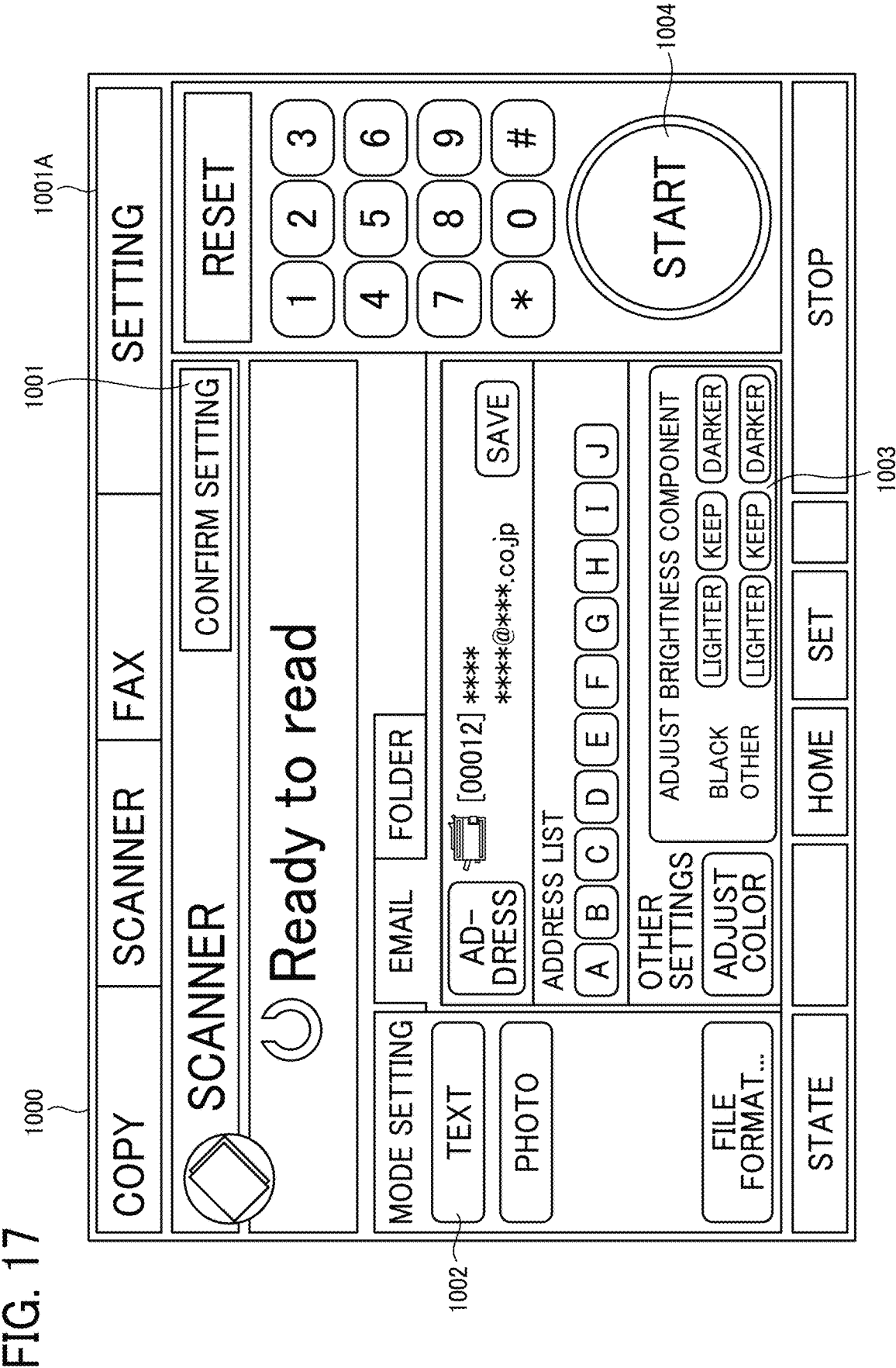
FIG. 17 is a diagram illustrating an example of a user interface setting screen for performing brightness component adjustment of the achromatization process.

FIG. 17 is a diagram illustrating an example of a UI setting screen for performing brightness component adjustment of the achromatization process 3102. A UI setting screen 1000 includes a "setting" tab 1001A, and displays the setting information displayed in FIG. 17 when a "confirm setting" button 1001 is touched (operated).

In the setting information, a setting corresponding to a text mode selected by a "text" button 1002 is displayed. In an adjustment information field 1003, adjustment information for adjusting the brightness component is displayed.

The adjustment information field 1003 includes an adjustment button for adjusting the brightness of a black character or a non-black character. The brightness can be kept as it is, made lighter, or made darker. When a user wants to emphasize the blackness of a black character, the user adjusts the brightness component.

The UI setting screen 1000 receives setting of the brightness component of black characters and that of non-black characters by these adjustment buttons. When a start button 1004 is touched, the setting is reflected in the achromatization processing unit 31.

For example, when the black character is set to be "darker" and the non-black character is set to be "lighter," the brightness (Y) component is multiplied by a coefficient to adjust the output value as in the following example of calculation.

Calculation Example

Black-print region: $out\_Y=in\_Y*0.9, out\_U=0, out\_V=0$

Non-black print region: $out\_Y=in\_Y*1.1, out\_U=in\_U, out\_V=in\_V$

This adjustment information enables not only achromatization but also adjustment of black characters and non-black characters to the darkness intended by the user.

Modification 8 of Embodiment 1

Next, as a modification 8, a description is given of a configuration for removing a selected color of, for example, ruled lines.

Figure 18A:
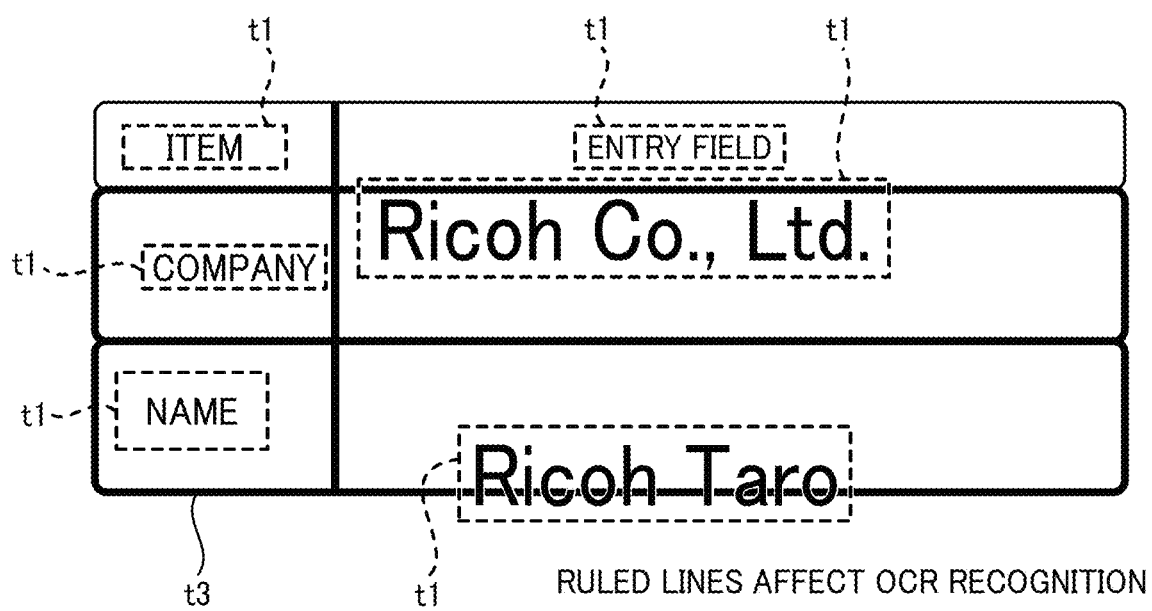
FIGS. 18A and 18B are diagrams for explaining an example of a configuration for removing a selected color of, for example, ruled lines.
Figure 18B:
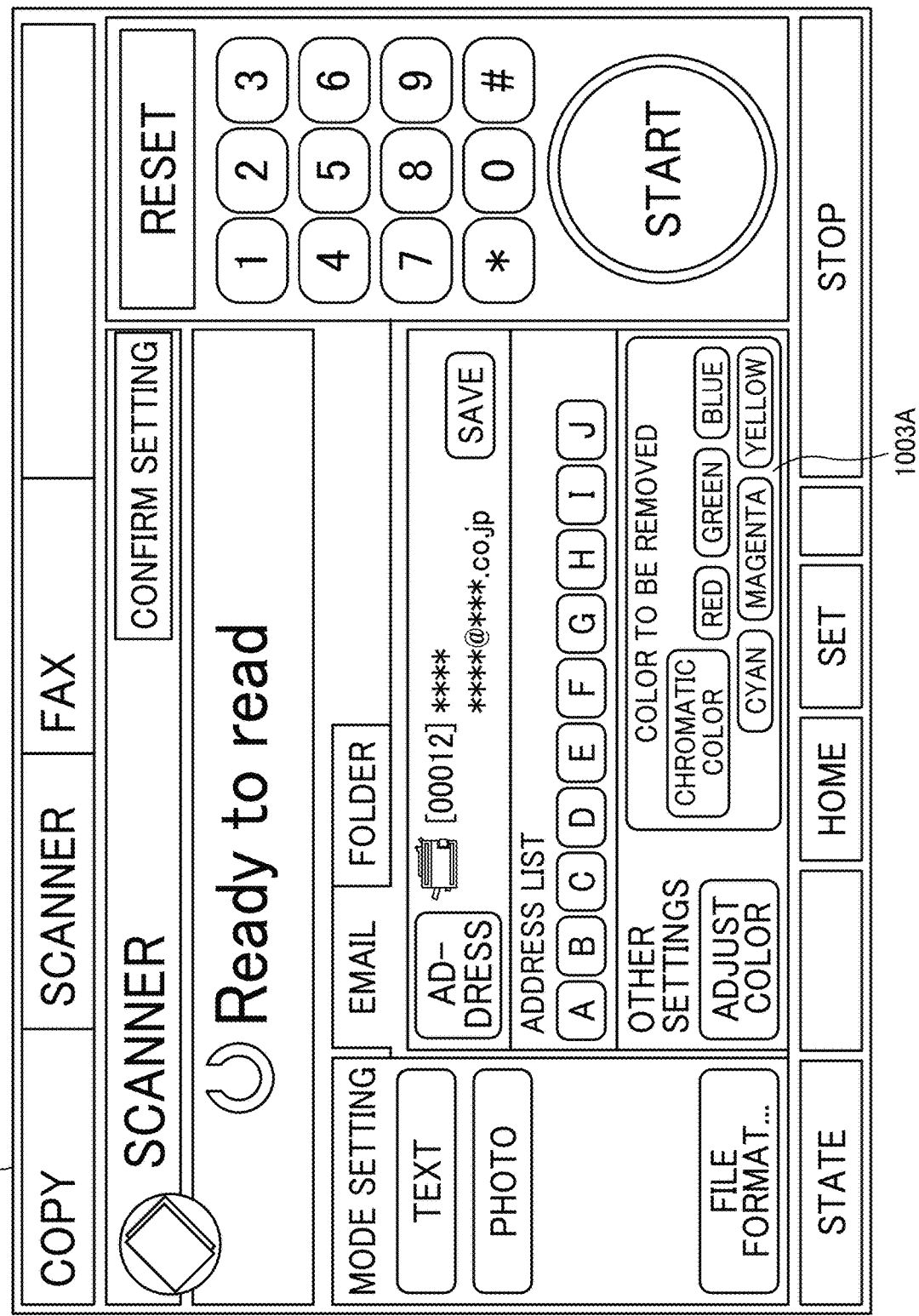
Figure 19:
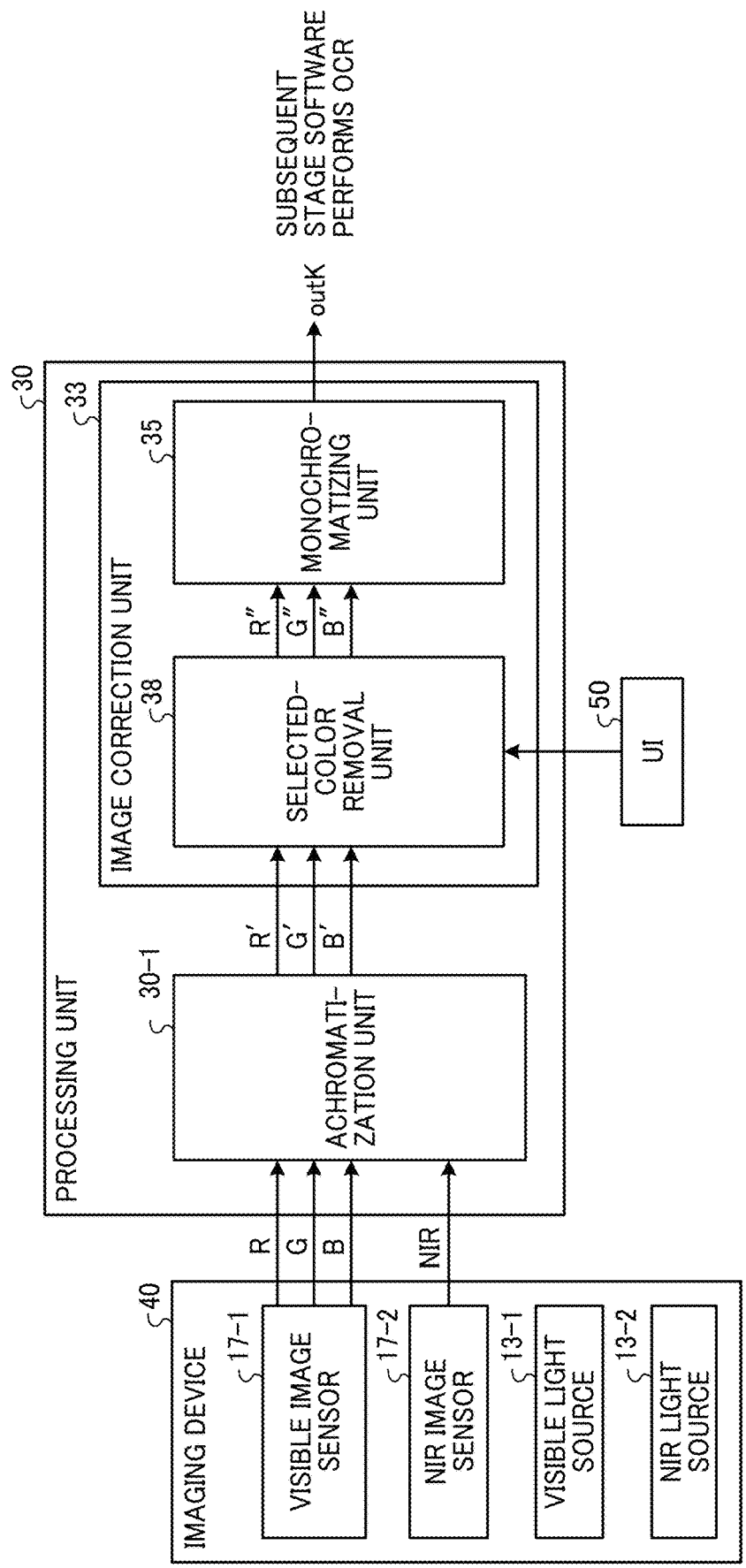
FIG. 19 is a block diagram illustrating an example of a functional configuration of an image correction unit according to Modification 8.

FIGS. 18A to 19 are diagrams for explaining the configuration for removing a selected color of, for example, ruled lines. As illustrated in FIG. 18A, in many cases, ruled lines 3 are drawn in a form in order to clarify the entry column. It is possible that the black-print region t1 of the entered black character overlaps the ruled line t3 due to misalignment of the print position of a font or misalignment of the input position of handwriting. If OCR is performed in this state, the ruled line t3 inhibits appropriate extraction of text information. Therefore, as illustrated in FIG. 18B, the UI setting screen 1000 includes a setting field 1003A. The setting field 1003A is for the user to designate a color to be removed. In the example illustrated in FIG. 18B, there are color designation buttons for chromatic color, red, green, blue, cyan, magenta, and yellow, and the user selects a color to be removed from these colors. Note that the type of color and the method of designating the color are not limited thereto, and may be modified as appropriate.

FIG. 19 is a block diagram illustrating an example of a functional configuration of the image correction unit 33 according to Modification 8. As illustrated in FIG. 19, the image correction unit 33 includes a selected-color removal unit 38.

The selected-color removal unit 38 receives the selected color via the UI setting screen 1000 provided by a UI 50 from the user with respect to the image R'G'B' which is achromatized by the achromatization unit 30-1, and performs removal of the selected color.

For example, for removing a ruled line, the user designates a color corresponding to the color of the ruled line in the setting field 1003A, and removes the selected color to remove the ruled line.

With such a configuration, ruled lines and the like can be removed, and erroneous character recognition at the time of OCR recognition can be reduced.

Modification 9 of Embodiment 1

A description is given of a configuration for outputting, as an image for OCR, a multi-value image that has been subjected to monochromatization.

Figure 20:
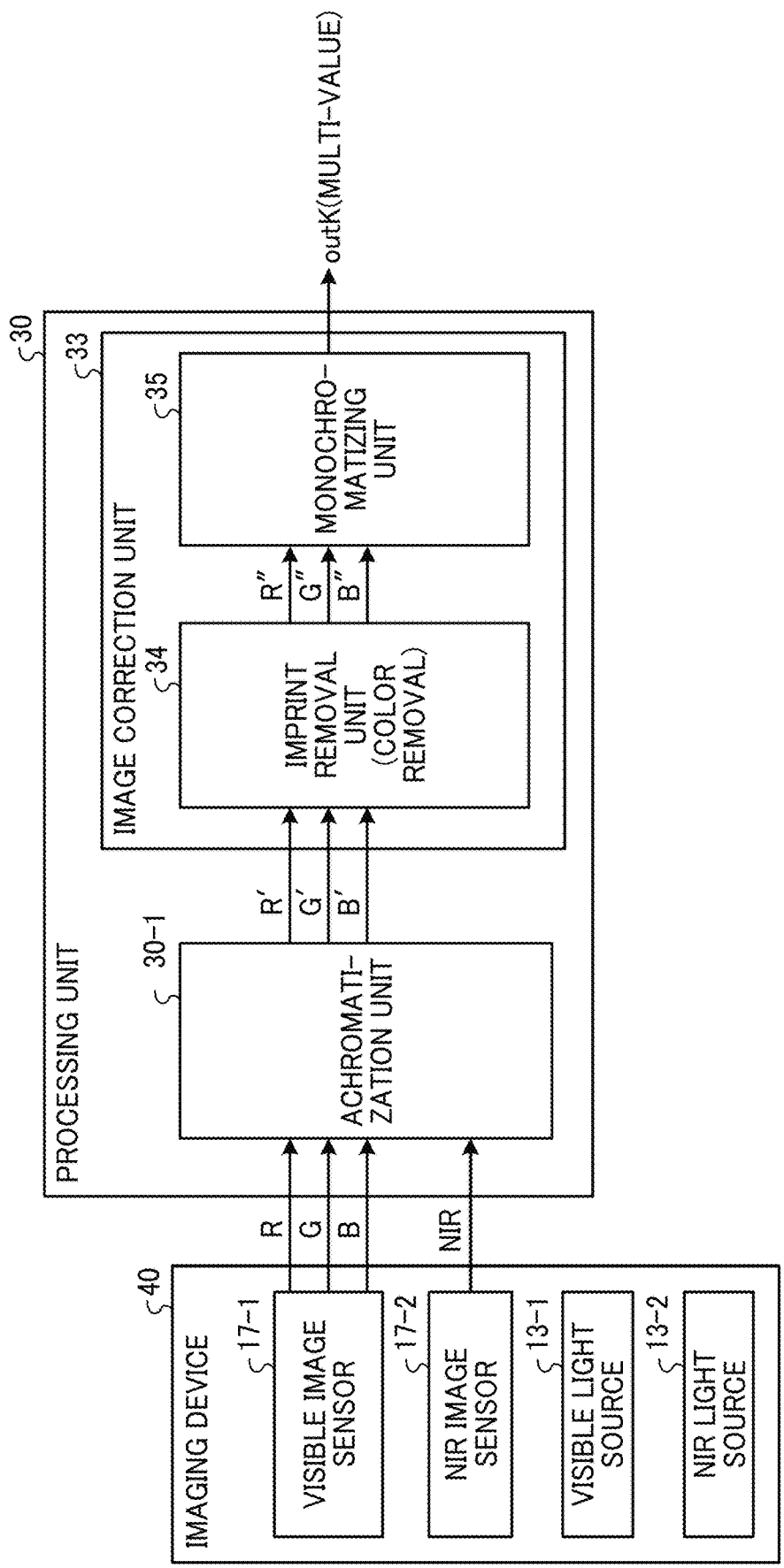
FIG. 20 is a block diagram illustrating an example of a configuration according to Modification 9.

FIG. 20 is a block diagram illustrating an example of a configuration according to Modification 9. As illustrated in FIG. 20, when a monochromatized image is output from the monochromatizing unit 35, the output unit 4a outputs a multi-valued monochromatized image outK instead of a binary image. The multi-valued monochromatized image is, for example, a grayscale image.

By outputting multi-valued image data in this way, it is possible to pass data to subsequent-stage OCR software without losing detailed information around the character. In the case where the subsequent-stage OCR software performs advanced binarization processing or the like, the processing can be utilized, thereby further improving the OCR recognition rate.

Although FIG. 20 illustrates a configuration for outputting single image data of a monochromatic image, the configuration is adaptable to outputting multi-image data also including an RGB image as illustrated in FIG. 10.

Modification 10 of Embodiment 1

A description is given of a configuration for outputting, as an image for OCR, a binary image obtained by binarizing a monochromatized image.

Figure 21:
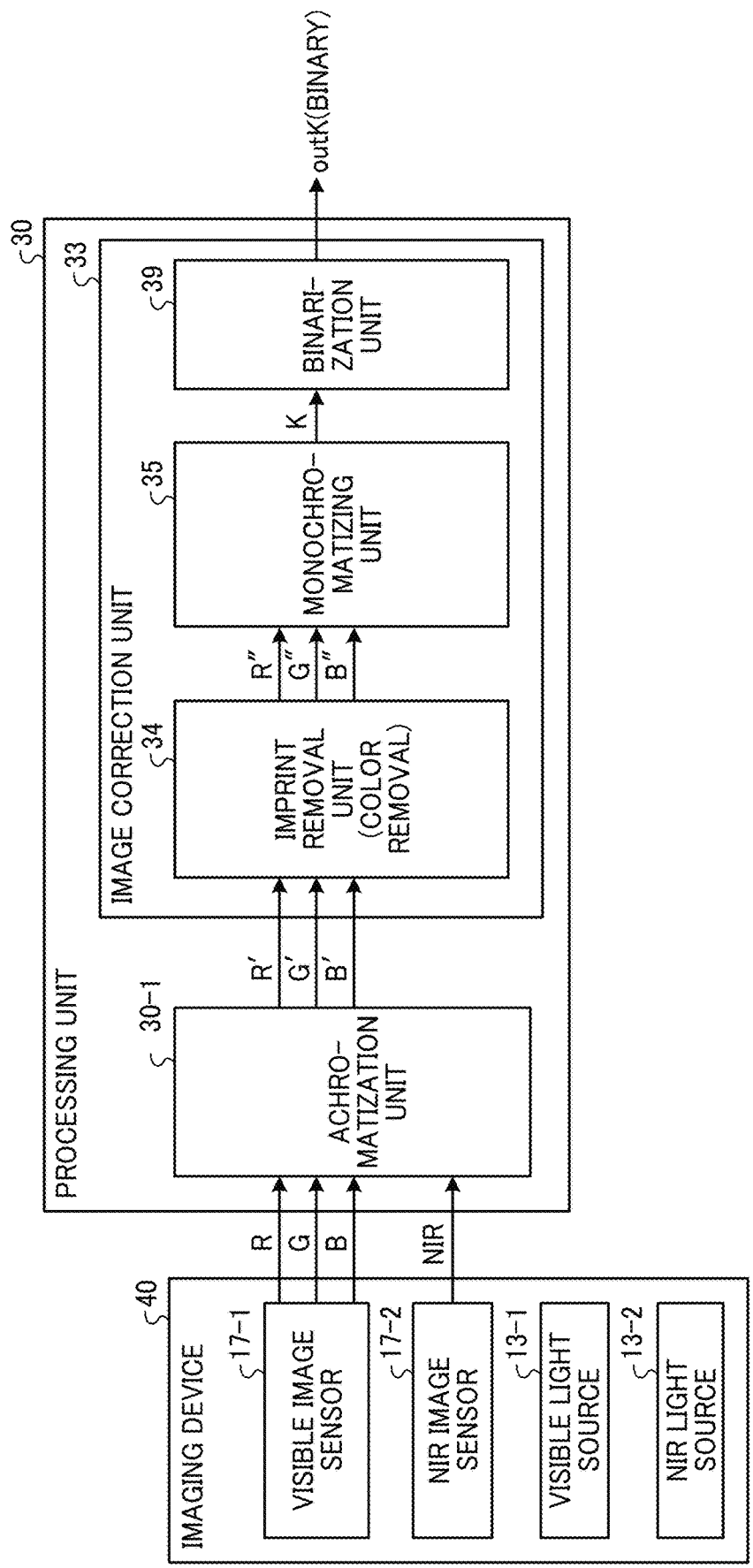
FIG. 21 is a block diagram illustrating an example of a configuration according to Modification 10.

FIG. 21 is a diagram illustrating an example of a configuration according to Modification 10. As illustrated in FIG. 21, the image correction unit 33 includes a binarization unit 39.

The binarization unit 39 performs binarization of the image after monochromatization output from the monochromatizing unit 35, and outputs a binary monochromatized image.

Outputting a binary image in this way has the effect of reducing the amount of data. In addition, when the image correction unit 33 performs binarization, binarization can be performed with a parameter suitable for the scanner 1. Even if the accuracy of binarization performed by the subsequent-stage OCR software is low, the OCR recognition rate can be improved regardless of the accuracy of the binarization performed by the OCR software, since the scanner performs the binarization and transfers the binarized data.

Although FIG. 21 illustrates a configuration for outputting single image data of a monochromatic image, the configuration is adaptable to outputting multi-image data also including an RGB image as illustrated in FIG. 10.

Embodiment 2

A part or all of the processing for removing the stamp imprint from the visible image performed by the scanner 1 or the external device according to Embodiment 1 may be performed by an image processing apparatus.

Figure 22:
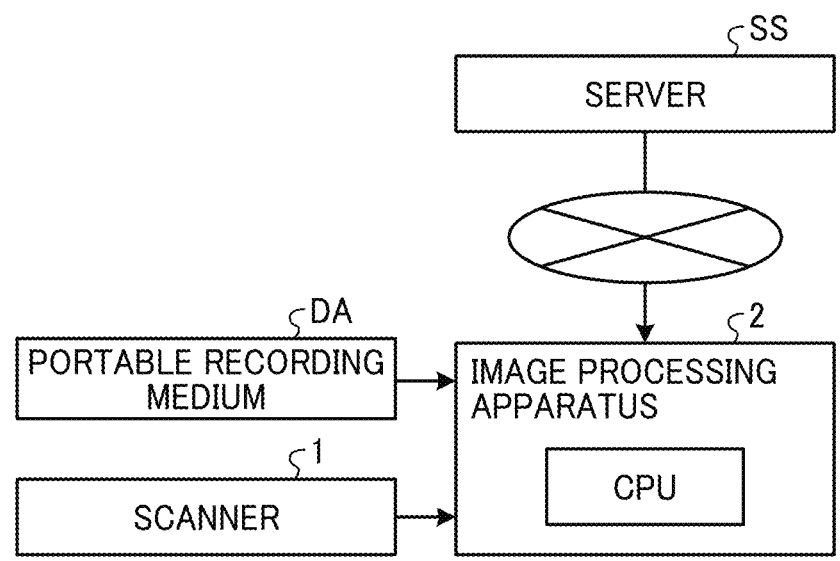
FIG. 22 is a block diagram illustrating a configuration of a system including an image processing apparatus according to Embodiment 2.

FIG. 22 is a block diagram illustrating a configuration of a system including an image processing apparatus 2 according to Embodiment 2. The image processing apparatus 2 receives the visible image and the invisible image output from the scanner 1 and performs the processing for removing the stamp imprint. In addition, the image processing apparatus 2 may acquire the visible image and the invisible image stored in a server SS and perform the processing for removing the stamp imprint. In addition, the image processing apparatus 2 may read out the visible image and the invisible image from a portable recording medium DA such as a semiconductor memory and perform the processing for removing the stamp imprint.

The image processing apparatus 2 includes a CPU. For example, the CPU executes a predetermined program to provide functions corresponding to the processing unit 30, the black-print region determination unit 32, and various functions for removing a stamp imprint from an image and for performing OCR A part or all of the functions may be implemented by hardware such as an ASIC. The image processing apparatus 2 outputs various images from an output unit to an external device such as a PC.

Since the various functions have already been described by taking the scanner and the external device as examples in Embodiment 1, further description thereof is omitted here.

Now, a description is given of Embodiment 3.

The scanner illustrated in Embodiment 1 and the image processing apparatus illustrated in Embodiment 2 may be included in an image forming apparatus.

Figure 23:
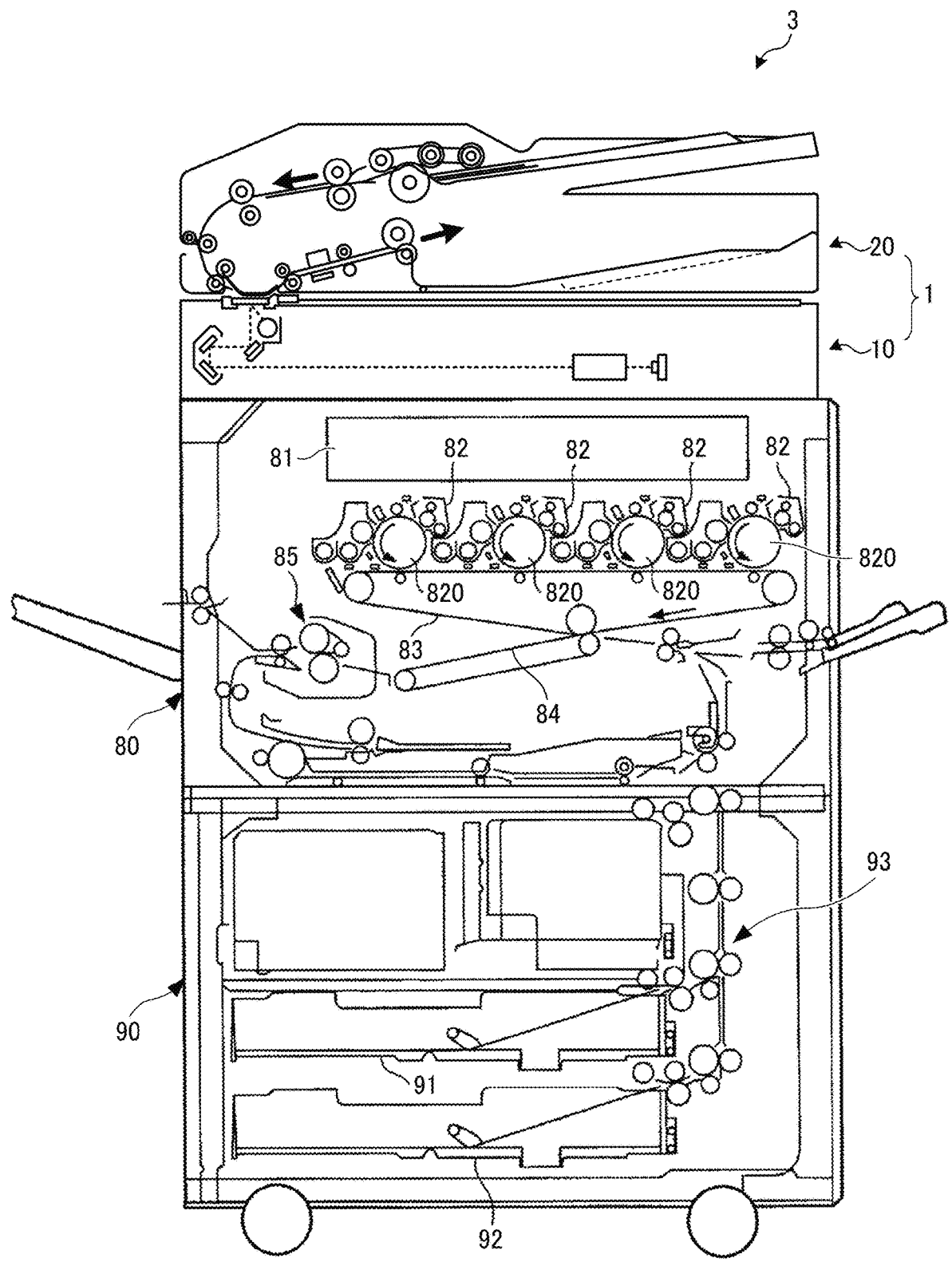
FIG. 23 is a schematic view illustrating a configuration of an image forming apparatus according to Embodiment 3.

FIG. 23 is a schematic view illustrating a configuration of an image forming apparatus according to Embodiment 3. FIG. 23 is a schematic view of an image forming apparatus 3 that is generally called a multifunction peripheral (MFP). The image forming apparatus 3 illustrated in FIG. 23 includes the scanner 1 (the scanner body 10 and the ADF 20) in an upper portion thereof. Since the configuration of the scanner 1 is described in Embodiment 1, a detailed description thereof is omitted here.

The image forming apparatus 3 illustrated in FIG. 23 includes an image forming section 80 and a sheet feeder 90 below the scanner body 10.

The image forming section 80 prints an image on a recording sheet according to a read image obtained by the scanner body 10. The recording sheet is an example of a recording medium. The read image is a visible image or an NIR image.

The image forming section 80 includes, for example, an optical writing device 81, tandem image forming units 82 of yellow (Y), magenta (M), cyan (C), and black (K) serving as image forming devices, an intermediate transfer belt 83, and a secondary transfer belt 84. In the image forming section 80, the optical writing device 81 writes an image to be printed on a photoconductor drum 820 of each image forming unit 82, and respective color toner images are transferred from the photoconductor drums 820 onto the intermediate transfer belt 83. The K component is formed of K toner containing carbon black.

In the example illustrated in FIG. 23, each of the four image forming units 82 for Y, M, C, and K includes the rotatable drum-shaped photoconductor drum 820. The photoconductor drum 820 is surrounded by image forming components such as a charging roller, a developing device, a primary transfer roller, a cleaner unit, and a discharger. The image forming components around the photoconductor drum 820 perform an image forming process to form an image on the photoconductor drum 820. The image thus formed on the photoconductor drum 820 is transferred, by the primary transfer roller, as a toner image onto the intermediate transfer belt 83.

The intermediate transfer belt 83 is entrained around a drive roller and a driven roller and disposed so as to pass through primary transfer nips between the four photoconductor drums 820 and the respective primary transfer rollers. The toner images primarily transferred onto the intermediate transfer belt 83 are secondarily transferred onto the recording sheet on the secondary transfer belt 84 by a secondary transfer device as the intermediate transfer belt 83 travels. As the secondary transfer belt 84 travels, the recording sheet is conveyed to a fixing device 85, where the toner image is fixed as a color image on the recording sheet. Then, the recording sheet is ejected onto an output tray outside the image forming apparatus 100.

The recording sheet is fed from one of sheet trays 91 and 92 of the sheet feeder 90, for example. The sheet trays 91 and 92 store different sizes of recording sheets. The recording sheet thus fed is conveyed through a conveyance unit 93 that includes a plurality of rollers to the secondary transfer belt 84.

The image forming section 80 is not limited to the one that forms an image by an electrophotographic method as described above. The image forming section 80 may be one that forms an image by an inkjet method.

Further, the image forming apparatus 3 is not limited to an MFP. The image forming apparatus 3 may be, for example, a printer that receives image data generated by a separate image processing apparatus via, for example, a communication network and prints the received image data.

Although examples of embodiments of the present disclosure and modifications thereof have been described above, the above-described embodiments are not intended to limit the scope of the present disclosure. Such embodiments and modifications may be modified into a variety of other forms. Various omissions, substitutions, and changes in the above-described embodiments and modifications may be made without departing from the spirit of the present disclosure. Such embodiments and modifications are within the scope and gist of this disclosure and are also within the scope of appended claims and the equivalent scope.

Aspects of the present disclosure are, for example, as follows.

Aspect 1 concerns an image processing apparatus that includes an input unit and an image processing unit. The input unit inputs, to a subsequent-stage processing unit including an image processing unit, visible image data obtained by reading a subject with a sensor having sensitivity to visible light of a light source in a visible wavelength range and invisible image data obtained by reading the subject with a sensor having sensitivity to invisible light of a light source in an invisible wavelength range. The image processing unit generates image data for displaying, in a designated color, a portion of the visible image data corresponding to a designated region of the invisible image data. The designated region has an absorption rate equal to or higher than a predetermined absorption rate.

According to Aspect 2, the image processing apparatus of Aspect 1 further includes an output unit to output the image data for displaying, generated by the image processing unit to an external device.

According to Aspect 3, in the image processing apparatus of Aspect 2, the output unit outputs the visible image data of the subject and the image data generated by the image processing unit to the external device.

According to Aspect 4, the image processing apparatus of Aspect 2 or 3 further includes a selected-color removal unit to remove a selected color from the image data for displaying, generated by the image processing unit, and a monochromatizing unit to perform monochromatization on the image data from which the selected color has been removed. Further, the output unit outputs the image data after monochromatization to the external device.

According to Aspect 5, in the image processing apparatus according to Aspect 4, the selected-color removal unit removes a selected color set by a user from the image data generated by the image processing unit.

According to Aspect 6, the image processing apparatus of Aspect 4 or 5 outputs the image data monochromatized by the monochromatizing unit as multi-valued image data.

According to Aspect 7, the image processing apparatus of Aspect 4 or 5 outputs binary image data obtained by binarizing the image data monochromatized by the monochromatizing unit.

According to Aspect 8, the image processing apparatus according to any one of Aspects 1 to 7 further includes a determination unit to determine the designated region of the invisible image data having the absorption rate equal to or higher than the predetermined absorption rate, and the determination unit determines the designated region by binarization of the invisible image data.

According to Aspect 9, in the image processing apparatus of Aspect 8, the determination unit includes a threshold determination unit to determine a threshold value based on a set background level and a set black level, and the determination unit performs the binarization with reference to the threshold value determined by the threshold determination unit.

According to Aspect 10, in the image processing apparatus of Aspect 9, the threshold determination unit includes a background-level detection unit to detect a background level of the visible image data of the subject, and a black-level detection unit to detect a black level of the visible image data of the subject. The threshold determination unit determines, based on the background level detected by the background-level detection unit and the black level detected by the black-level detection unit, the threshold value for each area of the visible image data of the subject.

According to Aspect 11, in the image processing apparatus of any one of Aspects 1 to 10, the image processing unit includes a brightness and color difference conversion unit and an RGB conversion unit. The brightness and color difference conversion unit converts RGB image data into brightness and color difference data. The RGB conversion unit adjusts the brightness and color difference data for displaying, in the designated color, the portion of the visible image data corresponding to the designated region, and convers the adjusted brightness and color difference data again to RGB image data.

According to Aspect 12, in the image processing apparatus of Aspect 11, the image processing unit adjusts a brightness signal included in the brightness and color difference data such that an output value of the brightness signal corresponds to a brightness signal adjustment setting value set by a user.

According to Aspect 13, in the image processing apparatus of any one of Aspects 1 to 12, the image processing unit sets, to black, the designated color in which the portion corresponding to the designated region of the visible image data is displayed.

According to Aspect 14, a scanner includes the image processing apparatus of any one of Aspects 1 to 13, a visible light source to irradiate a subject with visible light having a visible wavelength, an invisible light source configured to irradiate the subject with invisible light having an invisible wavelength, a first image sensor configured to receive reflected light of the visible light having the visible wavelength from the subject and output visible image data, and a second image sensor configured to receive reflected light of the invisible light having the invisible wavelength from the subject and output invisible image data.

According to Aspect 15, in the scanner of Aspect 14, the image processing unit receives the visible image data output by the first image sensor and the invisible image data output by the second image sensor.

According to Aspect 16, an image forming apparatus includes the image processing apparatus of any one of Aspects 1 to 13 or the scanner of Aspect 14 or 15; and an image forming unit configured to form an image based on the image data for displaying, generated by the image processing unit.

According to Aspect 17, a data management system includes the image processing apparatus of Aspect 3 or 4; and an information processing apparatus configured to store the visible image data transmitted from the image processing apparatus and the image data for displaying, generated by the image processing unit, in association with each other.

Aspect 18 concerns a method for performing image processing on visible image data obtained by reading a subject with a sensor having sensitivity to visible light from a light source in a visible wavelength range. The method includes receiving the visible image data of the subject and invisible image data obtained by reading the subject with a sensor having sensitivity to invisible light of a light source in an invisible wavelength range. The method further includes generating image data for displaying, in a designated color, a portion of the visible image data corresponding to a designated region of the invisible image data. The designated region has an absorption rate equal to or higher than a predetermined absorption rate.

Aspect 19 concerns an image processing apparatus that includes an input unit and an image processing unit. The input unit receives visible image data obtained by reading a subject with a sensor having sensitivity to visible light of a light source in a visible wavelength range and invisible image data obtained by reading the subject with a sensor having sensitivity to invisible light of a light source in an invisible wavelength range. The image processing unit generates image data for displaying, in a designated color, a portion of the visible image data corresponding to a designated region of the invisible image data. The designated region is an image region formed with a material including carbon.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits, digital signal processors, field programmable gate arrays, conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An image processing apparatus comprising circuitry configured to:
receive visible image data and invisible image data, the visible image data being obtained by reading of a subject with a sensor having sensitivity to visible light in a visible wavelength range, the invisible image data obtained by reading of the subject with a sensor having sensitivity to invisible light in an invisible wavelength range; and
generate image data for displaying, in a designated color, a portion of the visible image data overlapping a designated region of the invisible image data, the designated region having an absorption rate equal to or higher than a predetermined absorption rate.

2. The image processing apparatus according to claim 1, wherein the circuitry is configured to output the image data for displaying, to an external device external to the image processing apparatus.

3. The image processing apparatus according to claim 2, wherein the circuitry is configured to output the visible image data in addition to the image data for displaying, to the external device.

4. A data management system comprising:
the image processing apparatus according to claim 3; and
an information processing apparatus configured to store the visible image data transmitted from the image processing apparatus and the image data for displaying, in association with each other.

5. The image processing apparatus according to claim 2, wherein the circuitry is configured to:
remove a selected color from the image data for displaying;
perform monochromatization on the image data from which the selected color has been removed; and
output the monochromatized image data to the external device.

6. The image processing apparatus according to claim 5, wherein the circuitry is configured to receive selection of the selected color by a user and remove the selected color from the image data for displaying.

7. The image processing apparatus according to claim 5, wherein the circuitry is configured to output the monochromatized image data as multi-valued image data.

8. The image processing apparatus according to claim 5, wherein the circuitry is configured to:
binarize the monochromatized image data to generate binary image data; and
output the binary image data.

9. The image processing apparatus according to claim 1, wherein the circuitry is configured to:
binarize the invisible image data; and
determine the designated region based on the binarized invisible image data.

10. The image processing apparatus according to claim 9, wherein the circuitry is configured to determine a threshold value for binarization, based on a set background level and a set black level, and perform the binarization with reference to the threshold value.

11. The image processing apparatus according to claim 10, wherein the circuitry is configured to:
detect a background level of the visible image data;
detect a black level of the visible image data; and
determine, based on the detected background level and the detected black level, the threshold value for each area of the visible image data.

12. The image processing apparatus according to claim 1, wherein the circuitry is configured to:
convert RGB image data into brightness and color difference data;

adjust the brightness and color difference data for displaying, in the designated color, the portion of the visible image data corresponding to the designated region; and convert the adjusted brightness and color difference data again to RGB image data.

13. The image processing apparatus according to claim 12,
wherein the circuitry is configured to adjust a brightness signal included in the brightness and color difference data such that an output value of the brightness signal corresponds to a brightness signal adjustment setting value set by a user.

14. The image processing apparatus according to claim 1, wherein the circuitry is configured to set the designated color to black.

15. A scanner comprising:
the image processing apparatus according to claim 1;
a visible light source configured to irradiate a subject with the visible light in the visible wavelength range;
an invisible light source configured to irradiate the subject the invisible light in the invisible wavelength;
a first image sensor configured to receive reflected light of the visible light from the subject and output visible image data; and
a second image sensor configured to receive reflected light of the invisible light from the subject and output invisible image data.

16. The scanner according to claim 15,
wherein the circuitry of the image processing apparatus is configured to receive the visible image data output by the first image sensor and the invisible image data output by the second image sensor.

17. An image forming apparatus comprising:
the image processing apparatus according to claim 1; and
an image forming device configured to form an image according to the image data generated by the image processing apparatus.

18. An image processing method comprising:
receiving visible image data and invisible image data, the visible image data being obtained by reading of a subject with a sensor having sensitivity to visible light in a visible wavelength range, the invisible image data obtained by reading of the subject with a sensor having sensitivity to invisible light in an invisible wavelength range; and
generating image data for displaying, in a designated color, a portion of the visible image data overlapping a designated region of the invisible image data, the designated region having an absorption rate equal to or higher than a predetermined absorption rate.

19. An image processing apparatus comprising circuitry configured to:
receive visible image data and invisible image data, the visible image data being obtained by reading of a subject with a sensor having sensitivity to visible light in a visible wavelength range, the invisible image data obtained by reading of the subject with a sensor having sensitivity to invisible light in an invisible wavelength range; and
generate image data for displaying, in a designated color, a portion of the visible image data overlapping a designated region of the invisible image data, the designated region being an image region formed with a material including carbon.

* * * * *